(12) United States Patent
Winship, Sr.

(10) Patent No.: US 11,321,661 B1
(45) Date of Patent: May 3, 2022

(54) METHOD FOR BUILDING AND FILTERING CARRIER SHIPMENT ROUTINGS

(71) Applicant: Shiplify, LLC, Atlanta, GA (US)

(72) Inventor: Blanton C. Winship, Sr., Atlanta, GA (US)

(73) Assignee: Shiplify, LLC, Atlanta, GA (US)

( * ) Notice: Subject to any disclaimer, the term of this patent is extended or adjusted under 35 U.S.C. 154(b) by 1489 days.

(21) Appl. No.: 14/820,374

(22) Filed: Aug. 6, 2015

Related U.S. Application Data

(60) Provisional application No. 62/164,878, filed on May 21, 2015, provisional application No. 62/034,448, filed on Aug. 7, 2014.

(51) Int. Cl.
*G06Q 10/08* (2012.01)
*G01C 21/36* (2006.01)
(Continued)

(52) U.S. Cl.
CPC ... *G06Q 10/08355* (2013.01); *G01C 21/3605* (2013.01); *G06F 16/2282* (2019.01); *G06F 16/27* (2019.01); *G06F 16/284* (2019.01)

(58) Field of Classification Search
CPC .............. G06Q 10/0834; G06Q 50/28; G06Q 10/083–08355; G06F 16/2282; G06F 16/284; G06F 16/27
(Continued)

(56) References Cited

U.S. PATENT DOCUMENTS 6,047,271 A * 4/2000 Danford-Klein .... G06Q 10/087 705/400
7,287,002 B1 * 10/2007 Asher ................... G06Q 10/08 705/26.8
(Continued)

OTHER PUBLICATIONS

"Google Maps API FAQ" web page <https://developers.google.com/maps/faq> (<http://web.archive.org/web/20130509161257/https://developers.google.com/maps/faq> captured on May 9, 2013 using Wayback Machine). (Year: 2013).*
(Continued)

*Primary Examiner* — Michael P Harrington
*Assistant Examiner* — Brian A Tallman
(74) *Attorney, Agent, or Firm* — Polsinelli PC

(57) ABSTRACT

A method and system for determining available shipment options between origin and destination address locations includes defining a plurality of service area polygons as geospatial objects in a geospatial database that correspond to geographic service areas served by a carrier, building a plurality of route definitions that define the shipping services between each origin/destination pair of service area polygons, and defining a plurality of route guide polygons as geospatial objects in the geospatial database that further limit the available shipping services at predetermined locations within the service area polygons. The method also includes receiving a shipping request query that specifies the origin and destination address locations for the proposed shipment, converting the origin and destination address (Continued)

locations to origin and destination geospatial locations, and geospatially determining that the origin and destination geospatial locations fall within origin and destination geospatial service area polygon objects and within one or more geospatial route guide polygon objects. The method further includes eliminating routes with unavailable shipping services between the origin and destination address locations and offering routes with available shipping services for selection by the user.

30 Claims, 17 Drawing Sheets

(51) Int. Cl.
  *G06F 16/22*   (2019.01)
  *G06F 16/27*   (2019.01)
  *G06F 16/28*   (2019.01)

(58) Field of Classification Search
  USPC .................................................. 705/330–338
  See application file for complete search history.

(56) References Cited

U.S. PATENT DOCUMENTS

| | | | |
|---|---|---|---|
| 7,774,284 B2* | 8/2010 | Williams | G06Q 10/08 705/300 |
| 2002/0032573 A1* | 3/2002 | Williams | G06Q 10/08 705/335 |
| 2004/0139049 A1* | 7/2004 | Hancock | H04L 29/12009 |
| 2005/0060244 A1* | 3/2005 | Goolkasian | G06Q 10/087 705/28 |
| 2005/0278063 A1* | 12/2005 | Hersh | G06Q 10/06311 700/216 |
| 2009/0094084 A1* | 4/2009 | Rempel | G06Q 10/08 705/6 |
| 2009/0326799 A1* | 12/2009 | Crook | G06Q 30/02 701/533 |
| 2010/0223173 A1* | 9/2010 | Kadaba | B07C 3/00 705/34 |
| 2012/0136873 A1* | 5/2012 | Shaffer | G06Q 10/10 707/741 |
| 2016/0189102 A1* | 6/2016 | Schreiber | G06Q 10/08355 705/338 |

OTHER PUBLICATIONS

"Zip Code Tabulation Area (ZCTA) Frequently Asked Questions" web page <http://www.census.gov/geo/ZCTA/zctafaq.html?\> (<http://web.archive.org/web/20130508045951/http://www.census.gov/geo/ZCTA/zctafaq.html> captured on May 9, 2013 using Wayback Machine). (Year: 2013).*

* cited by examiner

| SLFY Primary | Origin Polygon | Destination Polygon | Direct Code | Transit Days | Origin Service Days | Destination Days | Transit Path | Service Modes |
|---|---|---|---|---|---|---|---|---|
| CR01 | 01_363 | 01_363 | D | 1 | 12345 | 12345 | CR01\|CITY_A\|AL | LTL |
| CR01 | 01_363 | 01_381 | D | 1 | 12345 | 12345 | CR01\|CITY_B\|TN | LTL |
| CR01 | 01_363 | 01_452 | D | 1 | 12345 | 12345 | CR01\|CITY_C\|OH | LTL |
| CR01 | 01_363 | 01_381 | D | 2 | 12345 | 12345 | CR01\|CITY_A\|AL\CR01\|CITY_B\|TN | LTL |
| CR01 | 01_381 | 01_452 | D | 3 | 12345 | 12345 | CR01\|CITY_A\|AL\CR01\|CITY_C\|OH | LTL |
| CR01 | 01_381 | 01_363 | D | 2 | 12345 | 12345 | CR01\|CITY_B\|TN\CR01\|CITY_A\|AL | LTL |
| CR01 | 01_381 | 01_452 | D | 2 | 12345 | 12345 | CR01\|CITY_B\|TN\CR01\|CITY_C\|OH | LTL |
| CR01 | 01_452 | 01_363 | D | 3 | 12345 | 12345 | CR01\|CITY_C\|OH\CR01\|CITY_A\|AL | LTL |
| CR01 | 01_452 | 01_381 | D | 2 | 12345 | 12345 | CR01\|CITY_C\|OH\CR01\|CITY_B\|TN | LTL |
| CR01 | 01_363 | 01_46001 | P | 3 | 12345 | 135 | CR01\|CITY_A\|AL\CR02\|CITY_B\|OH\CR02\|CITY_D\|IN | LTL |
| CR01 | 01_363 | 01_46038 | P | 3 | 12345 | 135 | CR01\|CITY_A\|AL\CR02\|CITY_B\|OH\CR02\|CITY_D\|IN | LTL |
| CR02 | 02_363 | 02_363 | D | 1 | 12345 | 12345 | CR02\|CITY_A\|AL | LTL |
| CR02 | 02_381 | 02_381 | D | 1 | 12345 | 12345 | CR02\|CITY_B\|TN | LTL |
| CR02 | 02_452 | 02_452 | D | 1 | 12345 | 12345 | CR02\|CITY_C\|OH | LTL |
| CR02 | 02_381 | 02_46001 | D | 2 | 12345 | 135 | CR02\|CITY_D\|IN | LTL |
| CR02 | 02_381 | 02_46038 | D | 2 | 12345 | 135 | CR02\|CITY_D\|IN | LTL |
| CR02 | 02_452 | 02_381 | D | 2 | 12345 | 12345 | CR02\|CITY_C\|OH\CR02\|CITY_B\|TN\CR02\|CITY_D\|IN | LTL |
| CR02 | 02_363 | 02_46038 | D | 2 | 12345 | 135 | CR02\|CITY_A\|AL\CR02\|CITY_B\|TN\CR02\|CITY_D\|IN | LTL |
| CR02 | 02_381 | 02_363 | D | 2 | 12345 | 12345 | CR02\|CITY_B\|TN\CR02\|CITY_A\|AL | LTL |
| CR02 | 02_381 | 02_452 | D | 2 | 12345 | 12345 | CR02\|CITY_B\|TN\CR02\|CITY_C\|OH | LTL |
| CR02 | 02_452 | 02_363 | D | 2 | 12345 | 12345 | CR02\|CITY_C\|OH\CR02\|CITY_A\|AL | LTL |
| CR02 | 02_452 | 02_381 | D | 2 | 12345 | 12345 | CR02\|CITY_C\|OH\CR02\|CITY_B\|TN | LTL |
| CR02 | 02_452 | 02_46001 | D | 2 | 12345 | 135 | CR02\|CITY_C\|OH\CR02\|CITY_D\|IN | LTL |
| CR02 | 02_452 | 02_46038 | D | 2 | 12345 | 135 | CR02\|CITY_C\|OH\CR02\|CITY_D\|IN | LTL |

FIG. 7

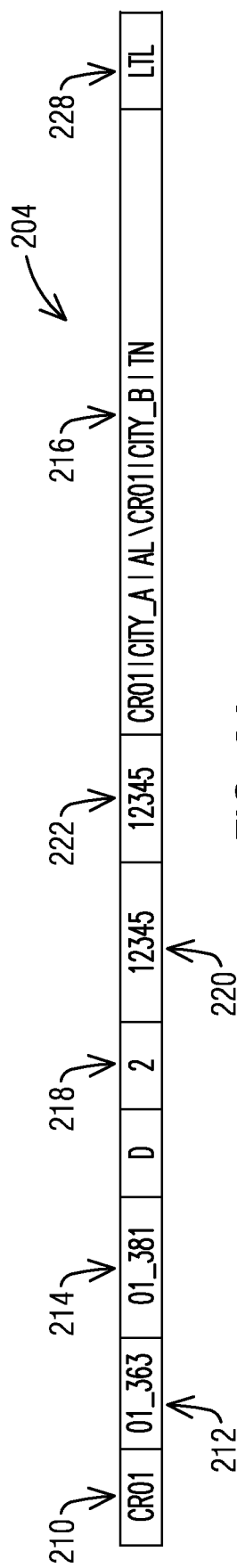
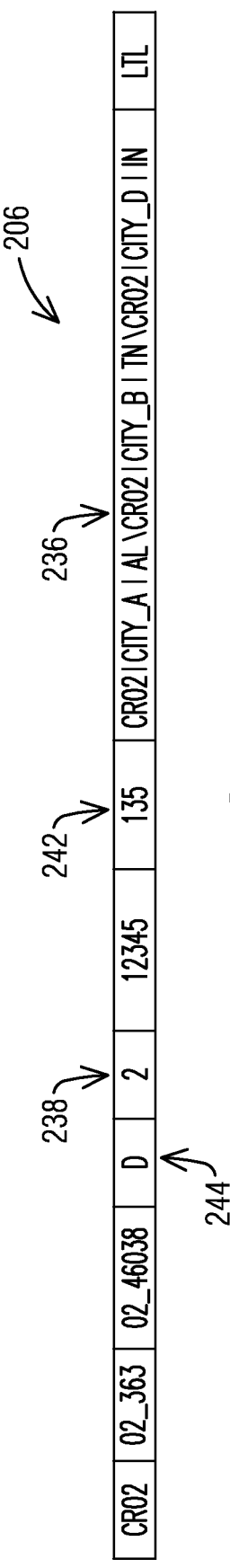
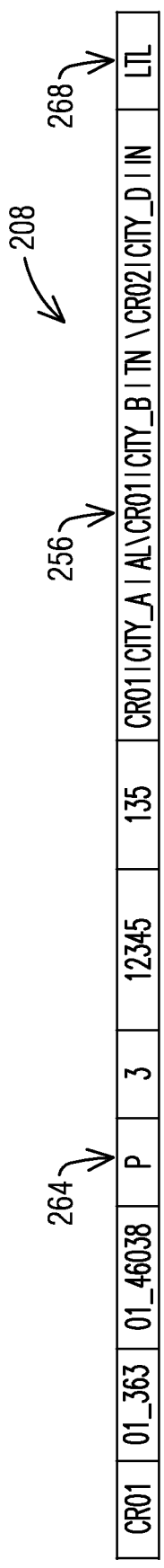

300

| Shiplify | Shipments | Search Lanes | Find Carriers | Admin |

Ⓐ Address A (Origin), Dothan, AL, United States ← 310 ✕

Ⓑ Address B (Destination), Memphis, TN, United States ← 312 ✕

Date & Time

| Pick up by | Deliver by |

June 2014

| SU | MO | TU | WE | TH | FR | SA |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | | | | | |

← 314

1:00 PM
↑ 315

Service Mode
- ☐ Auto Haulage
- ☐ Courier
- ☐ Ocean
- ☐ Rail

↑ 316  320 →

Freight Terms
- ⦿ Prepaid  ○ Collect
- COD-Collect on Deliver ○

Equipment
- ☐ Auto Rack Bi-Level
- ☐ Auto Rack Tri-Level
- ☐ Boxcar 50 ft Hi-Roof
- ☐ Boxcar 50 ft Standard Show more...

---

333 ↘  Save

CR01 — 332    $X,XXX.XX    330
Ⓐ CR01 | Dothan, AL — 334    (XXX)XXX-XXXX
Ⓑ CR01 | Memphis, TN — 335    (XXX)XXX-XXXX
2 days | 379 miles    Delivery | Tues, Jun 17, 2014

CR02  336  337    338    340
    $X,XXX.XX
Ⓐ CR02 | Dothan, AL    (XXX)XXX-XXXX
Ⓑ CR02 | Memphis, TN    (XXX)XXX-XXXX
2 days | 379 miles    Delivery | Tues, Jun 17, 2014

CR03    $X,XXX.XX    350
Ⓐ CR03 | Dothan, AL    (XXX)XXX-XXXX
Ⓑ CR03 | Memphis, TN    (XXX)XXX-XXXX
2 days | 379 miles    Delivery | Tues, Jun 17, 2014

CR04    $X,XXX.XX    360
Ⓐ CR04 | Dothan, AL    (XXX)XXX-XXXX
Ⓑ CR04 | Memphis, TN    (XXX)XXX-XXXX
2 days | 379 miles    Delivery | Tues, Jun 17, 2014

CR05    $X,XXX.XX    370
Ⓐ CR05 | Dothan, AL    (XXX)XXX-XXXX
Ⓑ CR05 | Memphis, TN    (XXX)XXX-XXXX
2 days | 379 miles    Delivery | Tues, Jun 17, 2014

FIG. 13

| SLFY Primary | Origin Polygon | Destination Polygon | Direct Code | Transit Days | Origin Service Days | Destination Days | Transit Path | Service Modes |
|---|---|---|---|---|---|---|---|---|
| CR01 | 01_Dothan | 01_Dothan | D | 1 | 12345 | 12345 | CR01 l Dothan l AL | LTL |
| CR01 | 01_Atlanta | 01_Atlanta | D | 1 | 12345 | 12345 | CR01 l Atlanta l GA | LTL |
| CR01 | 01_Atlanta | 01_GWCC_A | D | 1 | 12345 | 124 | CR01 l Atlanta l GA ⟵ 402 | LTL |
| CR01 | 01_Atlanta | 01_GWCC_C | D | 1 | 12345 | 135 | CR01 l Atlanta l GA | LTL |
| CR01 | 01_GWCC_A | 01_Atlanta | D | 1 | 124 | 12345 | CR01 l Atlanta l GA | LTL |
| CR01 | 01_GWCC_C | 01_Atlanta | D | 1 | 135 | 12345 | CR01 l Atlanta l GA | LTL |
| CR01 | 01_Dothan | 01_Atlanta | D | 2 | 12345 | 12345 | CR01 l Dothan l AL \ CR01 l Atlanta l GA | LTL |
| CR01 | 01_Dothan | 01_GWCC_A | D | 2 | 12345 | 124 | CR01 l Dothan l AL \ CR01 l Atlanta l GA | LTL |
| CR01 | 01_Dothan | 01_GWCC_C | D | 2 | 12345 | 135 | CR01 l Dothan l AL \ CR01 l Atlanta l GA | LTL |
| CR01 | 01_Atlanta | 01_Dothan | D | 2 | 12345 | 12345 | CR01 l Atlanta l GA \ CR01 l Dothan l AL | LTL |
| CR01 | 01_GWCC_A | 01_Dothan | D | 2 | 124 | 12345 | CR01 l Atlanta l GA \ CR01 l Dothan l AL | LTL |
| CR01 | 01_GWCC_C | 01_Dothan | D | 2 | 135 | 12345 | CR01 l Atlanta l GA \ CR01 l Dothan l AL | LTL |
| CR01 | 02_Dothan | 02_Dothan | D | 1 | 12345 | 12345 | CR02 l Dothan l AL | LTL |
| CR01 | 02_Atlanta | 02_Atlanta | D | 1 | 12345 | 12345 | CR02 l Atlanta l GA | LTL |
| CR02 | 02_Atlanta | 02_GWCC_A | P | 2 | 12345 | 124 | CR02 l Atlanta l GA \ CR01 l Atlanta l GA ⟵ 404 | LTL |
| CR02 | 02_Atlanta | 02_GWCC_C | P | 2 | 12345 | 135 | CR02 l Atlanta l GA \ CR01 l Atlanta l GA | LTL |
| CR02 | 02_GWCC_A | 02_Atlanta | P | 2 | 124 | 12345 | CR01 l Atlanta l GA \ CR02 l Atlanta l GA | LTL |
| CR02 | 02_GWCC_C | 02_Atlanta | P | 2 | 135 | 12345 | CR01 l Atlanta l GA \ CR02 l Atlanta l GA | LTL |
| CR02 | 02_Dothan | 02_Atlanta | P | 2 | 12345 | 12345 | CR02 l Dothan l AL \ CR02 l Atlanta l GA | LTL |
| CR02 | 02_Dothan | 02_GWCC_A | P | 3 | 12345 | 124 | CR02 l Dothan l AL \ CR02 l Atlanta l GA \ CR03 l Atlanta l GA | LTL |
| CR02 | 02_Dothan | 02_GWCC_C | P | 3 | 12345 | 135 | CR02 l Dothan l AL \ CR02 l Atlanta l GA \ CR03 l Atlanta l GA | LTL |
| CR02 | 02_Atlanta | 02_Dothan | D | 2 | 12345 | 12345 | CR02 l Atlanta l GA \ CR02 l Dothan l AL | LTL |
| CR02 | 02_GWCC_A | 02_Dothan | P | 3 | 124 | 12345 | CR01 l Atlanta l GA \ CR02 l Atlanta l GA \ CR02 l Dothan l AL | LTL |
| CR02 | 02_GWCC_C | 02_Dothan | P | 3 | 135 | 12345 | CR01 l Atlanta l GA \ CR02 l Atlanta l GA \ CR02 l Dothan l AL | LTL |

FIG. 18

| CR01 | 01_Atlanta | 01_GWCC_A | D | 1 | 12345 | 124 | CR01 | Atlanta | GA | LTL |
|---|---|---|---|---|---|---|---|---|
| CR01 | 01_Atlanta | 01_GWCC_C | D | 1 | 12345 | 135 | CR01 | Atlanta | GA | LTL |

| CR02 | 02_Atlanta | 02_GWCC_A | P | 2 | 12345 | 124 | CR02 | Atlanta | GA \ CR01 | Atlanta | GA | LTL |
|---|---|---|---|---|---|---|---|
| CR02 | 02_Atlanta | 02_GWCC_C | P | 2 | 12345 | 135 | CR02 | Atlanta | GA \ CR01 | Atlanta | GA | LTL |

| Shiplify | Shipments | Search Lanes | Find Carriers | Admin | |
|---|---|---|---|---|---|
| Manage Routing Rule | | | | | |
| New Routing Rule | | | | | |
| Criteria | | | | Actions ⌐556 | |
| Start Date | End Date | Origins | Destinations | Allowed Carriers | Promoted Carriers | Actions |
| 8/01/2014 | 8/31/2014 | Georgia | • 27601<br>• 27603<br>• 27604<br>• 27605<br>• 27615<br>• 27616 | | • CR01<br>(1) | Edit<br>× Delete |
| 8/01/2014 | 8/31/2014 | • 39705<br>• 39701 | • Minnesota<br>• North Carolina<br>• Indiana<br>• Texas | | • CR01<br>(1)<br>• CR02<br>(2) | Edit<br>× Delete |
| 8/01/2014 | 8/31/2014 | Georgia | • Destination Address D<br>New York, NY | • CR03<br>(1)<br>• CR04<br>(2) | | Edit<br>× Delete |
| 8/01/2014 | 8/31/2014 | | | | • CR02<br>(1) | Edit<br>× Delete |
| 8/01/2014 | 8/31/2014 | | | | • CR03<br>(1) | Edit<br>× Delete |

| Shiplify | Shipments | Search Lanes | Find Carriers | Admin |

Ⓐ Origin Address D, Atlanta, GA, United States  ← 562  ✕

Ⓑ Destination Address D, New York, NY, United States  ← 564  ✕

Date & Time

| Pick up by | Deliver by |

June 2014

| SU | MO | TU | WE | TH | FR | SA |
|----|----|----|----|----|----|----|
| 1  | 2  | 3  | 4  | 5  | 6  | 7  |
| 8  | 9  | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 |    |    |    |    |    |

1:00 PM

Service Mode
- ☐ Auto Haulage
- ☐ Courier
- ☐ Ocean
- ☐ Rail

Show more...

Freight Terms
- ⊙ Prepaid   ○ Collect
- COD—Collect on Deliver ○

Save Search

CR01     *Promoted ─ 556                                560
Ⓐ CR01 | Atlanta, GA
Ⓑ CR01 | Minneapolis, MN
2 days | 379 miles     Delivery | Tues, Jun 17, 2014

CR02     *Promoted ─ 556                                570
Ⓐ CR02 | Atlanta West, GA
Ⓑ CR02 | Minneapolis, MN
2 days | 379 miles     Delivery | Tues, Jun 17, 2014

CR03
Ⓐ CR03 | Atlanta West, GA
Ⓑ CR03 | Minneapolis, MN
2 days  379 miles     Delivery | Tues, Jun 17, 2014

METHOD FOR BUILDING AND FILTERING CARRIER SHIPMENT ROUTINGS

CROSS-REFERENCE TO RELATED APPLICATIONS

This application claims the benefit of U.S. Provisional Patent Application No. 62/034,448, filed 7 Aug. 2014, and U.S. Provisional Patent Application No. 62/164,878, filed 21 May 2015, each of which is incorporated by reference in its entirety herein and for all purposes.

TECHNOLOGICAL FIELD

The present disclosure generally relates to computerized systems and methods for accurately modeling and identifying available shipment options and costs that are provided by one or more competing freight carriers between origin address locations and destination address locations throughout a geographic region.

BACKGROUND

For many years, the freight transportation industry has relied upon rudimentary route tables to plan and schedule shipping services to transport goods between themselves and their vendors or customers. The route tables are generally compilations of terminal-to-terminal routes that utilize basic carrier information such as carrier identifiers (i.e. the Standard Carrier Alpha Codes (SCACs)), terminal codes and postal codes, along with the transit times between terminals, to estimate the approximate mileage, delivery time, and costs for shipping between terminals with subsequent delivery to any of the thousands of destination address locations that are lumped together within each of the postal codes. Under this system, any specific restrictions, limitations, or extra tariffs relating to picking up the goods at a specific origin address location or delivering the goods to a specific destination address location are often known only to the personnel working at the nearest shipping terminal associated those locations, and thus were often omitted from regional cost estimates or quotations. This has created the potential for incurring extra costs during pick up or delivery that are either charged back to the customer (an unattractive option when trying to compete with other carriers for business) or absorbed by the carrier (potentially an even worse alternative for the carrier). Because of their inability to obtain detailed information that is both accurate and timely for any particular address location, many carriers have taken to adding price buffers to their quotations for unfamiliar routes to ensure that the goods could be delivered profitably, even if extra charges are incurred.

Furthermore, even if the location-specific or address-specific information is known by a particular carrier that would allow them to provide more accurate and cost-effective quotations, the carrier is under no obligation to share this information with their competitors. This lack of distribution of essential information can result in anti-competitive arrangements and inefficiencies that are detrimental to the customers seeking comparative quotations for these shipping services, other business entities that either provide the goods for pick up at the origin address location or receive the goods at the destination address location, and to the shipping industry in general.

Consequently, a need exists for information exchange systems and methods that accurately identify most if not all of the available shipping options between origin and destination address locations throughout a geographic region, while at the same time taking into account any specific restrictions, limitations or extra tariffs relating to picking up the goods at the specific origin address location and delivering the goods to the specific destination address location. It is toward such information exchange systems and methods that the present disclosure is directed.

SUMMARY

As will be appreciated by one of skill in the art, the route determination system and methods summarized below can overcome numerous challenges present in the available prior art by automating the identification of most, if not all, shipment options provided by a plurality of competing carriers between origin address locations and destination address locations. The route determination system and methods can identify these shipment options, including any specific restrictions, limitations or extra tariffs relating to the origin and destination address locations, at a high level of granularity that allows for the automatic differentiation between adjacent physical addresses, or even between physical locations within the same address. In addition, this level of precision and accuracy can be made available to any authorized user at the beginning of the shipment planning and carrier selection process, even if the user is remotely located and has no prior experience with the carrier or the entities, whether business, residential, governmental, etc., at the origin and destination address locations. Consequently, the route determination system and methods can provide both the users and the carriers with highly accurate and complete information that is useful for achieving more efficient and timely service that is also less costly by removing the now-unnecessary price buffers that are currently required in the art.

Briefly described, a method for determining available shipment options between origin and destination address locations includes defining, by an electronic processor, a plurality of virtual service area polygons as geospatial objects in a geospatial database for each of a plurality of carriers, with each plurality of service area polygons corresponding to a plurality of physical service areas that together form a geographic region serviced by that carrier using a network of terminals distributed throughout the geographic region.

The method also includes building, by an electronic processor, one or more routes that define an available shipping service between a first service area polygon and a second service area polygon selected from each geographic region, with each of the first service area polygons at least partially overlapping the other first service area polygons and each of the second service area polygons at least partially overlapping the other second service area polygons. The available shipping service for each route generally comprises one or more service modes provided by that carrier that are available for collecting from substantially all of the locations within the first service area polygon and for delivering to substantially all of the locations within the second service area polygon. The available shipping service also includes an origin time window for collecting from substantially all of the locations within the first service area polygon, a destination time window for delivering to substantially all of the locations within the second service area polygon, a transit path between a first terminal that services the first service area polygon and a second terminal that services the second service area polygon, and a transit time along the transit path between the first terminal and the second terminal.

The method further includes defining, also by an electronic processor, one or more route guide polygons as geospatial objects in the geospatial database that overlie each of the first service area polygons and that include one or more restrictions that further limit (e.g. restricts, eliminates, adds an additional fee or tariff, and the like) the available shipping service between the first service area polygon and the second service area polygon in each geographic region.

By an electronic processor, the method also includes receiving a shipping request query from a user to collect a shipment of goods at an origin address location and to deliver the shipment of goods to a destination address location, converting the origin address location to an origin geospatial or latitude/longitude location and the destination address location to a destination geospatial or latitude/longitude location, geospatially determining that the origin geospatial location falls within the first service area polygon in each geographic region and within the one or more route guide polygons, and geospatially determining that the destination geospatial location falls within the second service area polygon in each geographic region.

By an electronic processor, the method further includes eliminating routes with unavailable shipping services between the first service area polygon and the second service area polygon in each geographic region, in accordance with the one or more restrictions, and offering routes with available shipping services between the origin address location and the destination address location for selection by the user.

Another representative implementation of the method for determining available shipment options between origin and destination address locations includes defining, by an electronic processor, a plurality of virtual service area polygons as geospatial objects in a geospatial database, with each virtual service area polygon corresponding to one of a plurality of physical service areas that together form a geographic region serviced by at one or more carriers using a network of terminals distributed throughout the geographic region.

The method also includes building, by an electronic processor, a route defining an available shipping service provided by the carriers between a first service area polygon and one or more second service area polygons selected from the plurality of service area polygons. The available shipping service generally comprises one or more service modes that are available for collecting from substantially all of the locations within the first service area polygon and for delivering to substantially all of the locations within the second service area polygon, an origin time window for collecting from substantially all of the locations within the first service area polygon, a destination time window for delivering to substantially all of the locations within the second service area polygon, a transit path between a first terminal that services the first service area polygon and a second terminal that services the second service area polygon, and a transit time along the transit path between the first terminal and the second terminal.

The method further includes defining, also by an electronic processor, one or more route guide polygons as geospatial objects in the geospatial database that overlie one of the first service area polygon and the second service area polygon and that include one or more restrictions that further limit (e.g. restricts, eliminates, adds an additional fee or tariff, and the like) the available shipping service between the first service area polygon and the second service area polygon.

By an electronic processor, the method also includes receiving a shipping request query from a user to collect a shipment of goods at an origin address location and to deliver the shipment of goods to a destination address location, converting the origin address location to an origin geospatial or latitude/longitude location and the destination address location to a destination geospatial or latitude/longitude location, geospatially determining that the origin geospatial location falls within the first service area polygon and that the destination geospatial location falls within the second service area polygon, and geospatially determining that one of the origin geospatial location and the destination geospatial location falls within the one or more route guide polygons.

By an electronic processor, the method further includes limiting the shipping service of the route between the first service area polygon and the second service area polygon in accordance with the one or more restrictions, and offering the route with limited available shipping service between the origin address location and the destination address location for selection by the user.

Another representative implementation of the present disclosure includes a route determination system for determining available shipment options between an origin address location and a destination address location that includes a data storage unit having stored therein a geospatial route database and a computer coupled to the data storage unit and in communication with the route database. The route database generally includes geospatial object definitions for a plurality of virtual service area polygons, each virtual service area polygon corresponding to one of a plurality of physical service areas that together form geographic regions serviced by a plurality of carriers, a plurality of route definitions, each defining an available shipping service provided by one or more carriers between any two of the service area polygons, and geospatial object definitions for a plurality of route guide polygons that overlie the service area polygons and that include one or more restrictions that further limit (e.g. restricts, eliminates, adds an additional fee or tariff, and the like) the available shipping service to the service area corresponding to that geospatial portion of the service area polygon.

In addition, the computer is generally configured to receive a shipping request query from a user to collect a shipment of goods at an origin address location and to deliver the shipment of goods to a destination address location, and to convert the origin address location to an origin geospatial or latitude/longitude location and the destination address location to a destination geospatial or latitude/longitude location. The computer is also configured to geospatially determine that the origin geospatial location falls within a first service area polygon in each geographic region and within one or more route guide polygons that overlie one of the first service area polygons, and to geospatially determine that the destination geospatial location falls within a second service area polygon in each geographic region. The computer is further configured to eliminate one or more routes with now-unavailable shipping services between the first service area polygon and the second service area polygon in a geographic region, in accordance with a restriction in an overlying route guide, and to offer the remaining routes with available shipping services between the origin address location and the destination address location for selection by the user.

Another representative implementation of the present disclosure includes a method for identifying and marking address locations within a shipping service area having shipping service limitations. The method includes defining, by an electronic processor, a plurality of service area polygons as geospatial objects in a geospatial database, with each service area polygon corresponding to one of a plurality of physical service areas that together form a geographic region serviced by at least one carrier using a network of terminals distributed throughout the geographic region. The method further includes defining, also by electronic process, a plurality of route guide polygons as geospatial objects in the geospatial database, with each route guide polygon overlying one or more address locations within a service area polygon and including one or more restrictions that further limit the available shipping service at that address location, as well as searchable identifiers corresponding to the at least one restriction. In one aspect the method can include querying the geospatial database on a searchable identifier to identify the address locations within the shipping service area having a particular shipping service limitation of interest, such as the an absence of a loading dock at the address location requiring a lift-gate service for all shipments that are heavier than a predetermined weight or larger than a predetermined size.

The disclosure will be better understood upon review of the detailed description set forth below taken in conjunction with the accompanying drawing figures, which are briefly described as follows.

BRIEF DESCRIPTION OF THE DRAWINGS

FIG. 7 is an exemplary route table depicting various routes between service area polygons, in accordance with another representative implementation.

FIGS. 8A-8C are individual routes selected from the route table of FIG. 7.

FIG. 13 is a representative screen shot of the results of a shipping request query by a user, in accordance with a representative implementation.

FIG. 18 is an exemplary route table depicting various routes between the service area polygons illustrated in FIGS. 16-17.

FIGS. 19A-9B are sets of routes selected from the route table of FIG. 18.

FIG. 21 is a representative screen shot of routing rule management system for managing the routing rule of FIG. 20.

FIG. 22 is a representative screen shot of the results of a shipping request query after application of the routing rule of FIG. 20.

FIG. 23 is a representative screen shot of the results of a shipping request query after application of the promotion routing rule, in accordance with another representative implementation.

Those skilled in the art will appreciate and understand that, according to common practice, various features of the drawings discussed below are not necessarily drawn to scale, and that dimensions of various features and elements of the drawings may be expanded or reduced to more clearly illustrate the implementations of the present disclosure described herein.

DETAILED DESCRIPTION

The present disclosure relates to systems and methods for building and filtering carrier shipment routes in order to automatically determine the available shipping options between an origin address location and a destination address location provided by a user. The system and methods generally include means for identifying those routes which match the user's shipping criteria to the available shipping services provided by multiple carriers to those particular origin and destination address locations, and for presenting the matching routes for selection by the user. As described in more detail below, the system and methods disclosed herein can provide several significant advantages and benefits over other systems and methods for determining available carrier shipment routes between origin and destination address locations. It is noted, however, that the recited advantages are not meant to be limiting in any way, as one skilled in the art will appreciate that other advantages may also be realized upon practicing the present disclosure.

Figure 1:
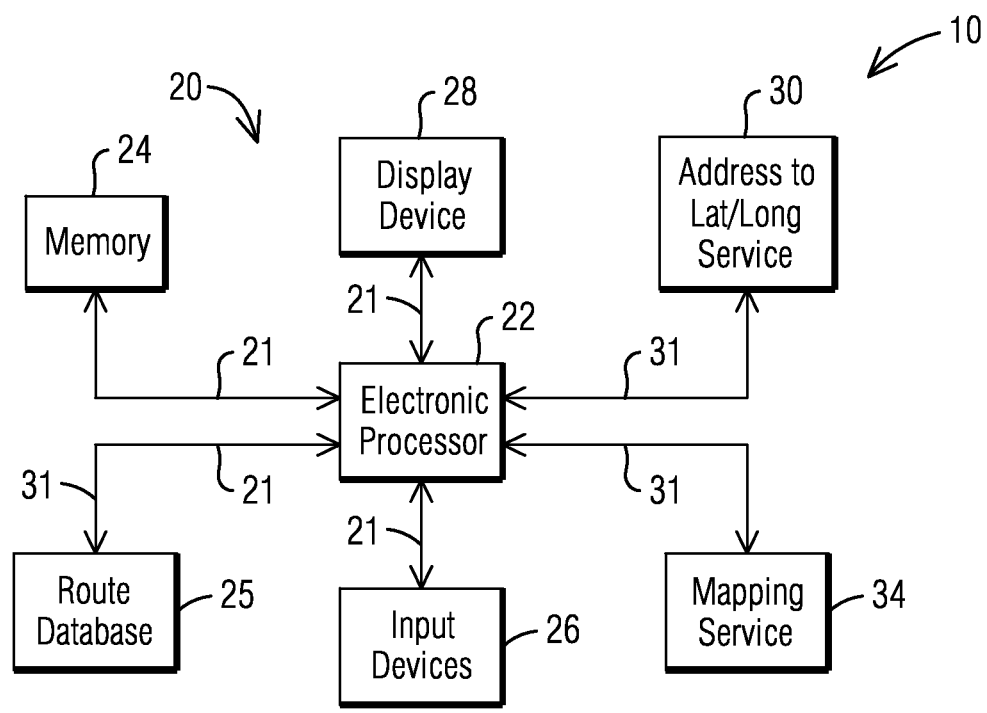
FIG. 1 is a schematic diagram that illustrates a computer system for implementing a method for building and filtering carrier shipment routings, in accordance with one representative implementation of the present disclosure.
Figure 2:
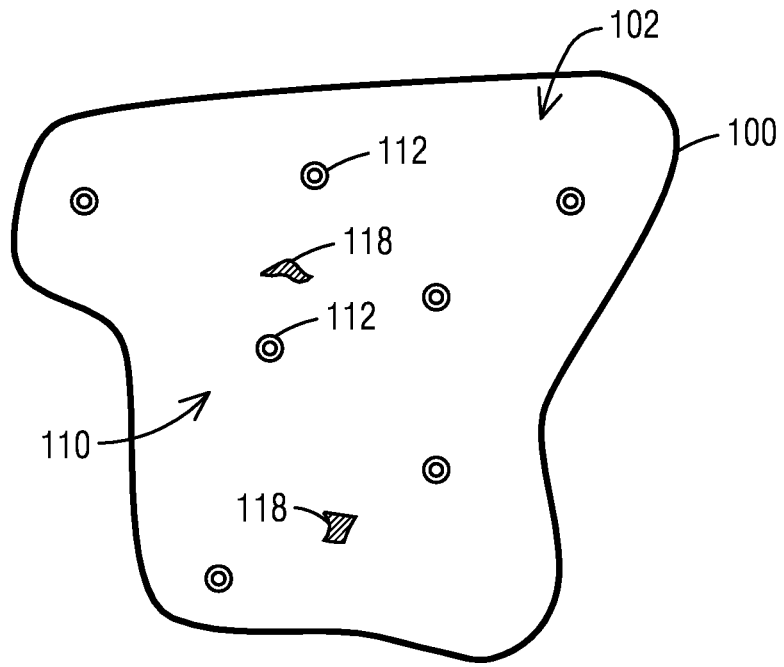
FIG. 2 is a schematic map of a geographic region serviced by a shipping carrier through a network of terminals distributed throughout the geographic region, in accordance with another representative implementation.

Referring now in more detail to the drawing figures, wherein like features are identified with like reference numerals throughout the several views, FIG. 1 illustrates one representative implementation of a system 10 for building and filtering carrier shipment routings, and which may also be known as a route determination system. The route determination system 10 can be implemented in route determination software, as an executable program, that is executable by a special or general purpose digital computer 20, such as a personal computer (PC; IBM-compatible, Apple-compatible, or otherwise), workstation, minicomputer, or mainframe computer.

Generally, in terms of the hardware architecture shown in FIG. 1, the computer 20 includes an electronic processor 22, memory 24, a route database 25, one or more input devices 26, and one or more display or output devices 28 (or peripherals) that are communicatively coupled via a local interface 21. The local interface 21 can include but is not limited to, one or more buses or other wired or wireless connections, as is known in the art. The local interface 21 may also have additional elements that are omitted for simplicity, such as controllers, buffers (caches), drivers, repeaters, and receivers, to enable communications. Further, the local interface 21 may also include address, control, and/or data connections to enable appropriate communications among the aforementioned components.

The electronic processor 22 is a hardware device for executing software, particularly that stored in memory 24. The processor 22 can be any custom made or commercially available processor, a central processing unit (CPU), an auxiliary processor among several processors associated with the computer 20, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86, i960, Pentium, Celeron, Xeon or Itanium series microprocessor from Intel Corporation, a PowerPC microprocessor from IBM, a Sparc microprocessor from Sun Microsystems, Inc, or a 68xxx series microprocessor from Motorola Corporation.

The memory 24 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 24 may incorporate electronic, magnetic, optical, and/or other types of storage media.

The memory 24 can also have a distributed architecture that includes various additional memory components that are situated remote from one another but can be locally accessed by the processor 20 via the local interface 21 or remotely via an internet connection 31. One such additional memory component can be the route database 25 that stores the definition data for a plurality of virtual geometric objects and for a plurality of routes that link the virtual geometric objects together. As will be discussed in more detail below, both the virtual geometric objects and the routes stored in the route database 25 are operated upon by the software running on the processor 22 in determining the available carrier shipment routes between an origin address location and a destination address location.

The software in memory 24 may include one or more separate programs, each of which comprises an ordered listing of executable instructions for implementing logical functions. In the example of FIG. 1, the software in the memory 24 includes a route determination program, in accordance with the present disclosure, and a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (1) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation). The operating system essentially controls the execution of other computer programs, such as the route determination program, and provides scheduling, input-output control, file and data management, memory management, and communication control and related services.

The route determination program in memory 24 may be a source program, executable program (object code), script, or any other entity comprising a set of instructions to be performed. When a source program, the route determination program needs to be translated via a compiler, assembler, interpreter, or the like, which may or may not be included within the memory 24, so as to operate properly in connection with the O/S. Furthermore, the route determination program can be written as (a) an object-oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing aspects of the present disclosure, the route determination program is written in an object-oriented programming language with PostGIS functionality that allows the executable program to build, manage, analyze and query virtual GIS-based objects stored in the route database 25.

The input devices 26 may include but are not limited to a keyboard, mouse, scanner, microphone, and the like. Furthermore, the output devices 28 may also include but are not limited to a printer, a display, and the like. Finally, the route determination system 10 may include additional I/O devices that communicate both inputs and outputs, for instance but not limited to, a NIC or modulator/demodulator (for accessing other files, devices, systems, or a network), a radio frequency (RF) or other transceiver, a telephonic interface, a bridge, a router, etc. Although not shown, it is to be understood that the route determination system 10 can be electronically accessed by both the administrator and programmers who build and maintain the system, as well as by the customers and end-users who access the system to enter their shipping requirements and to view their shipping options. The customers and end-users will generally access the route determination system 10 over the internet using I/O devices such as a computer or a portable electronic device.

If the computer 20 is a PC, workstation, intelligent device or the like, the software in the memory 24 may further include a basic input output system (BIOS) (omitted for simplicity). The BIOS is a set of essential software routines that initialize and test hardware at startup, start the O/S, and support the transfer of data among the hardware devices. The BIOS is stored in ROM so that the BIOS can be executed when the computer 20 is activated.

In addition to the computer 20, the route determination system 10 generally includes access to one or more independently-operated software services that assist with the performance of certain functions in the method for building and filtering carrier shipment routings. For instance, the route determination system 10 can include remote access to an address-to-latitude/longitude conversion service 30 that assists with the conversion of a street address location to a latitude/longitude location. In one aspect the conversion service 30 can be the Google Places® API that is accessed by the processor 22 via an internet connection 31. The route determination system 10 can also include remote access to a mapping service 34 that assists with the creation of virtual geospatial polygons through a map-based graphical interface. In another aspect the mapping service 34 can be the Google Maps® API that is also accessed by the processor 22 via an internet connection 31.

When the computer 20 is in operation, the electronic processor 22 is configured to execute software stored within the memory 24, to communicate data to and from the memory 24 and the route database 25, and to generally control operations of the computer 20 pursuant to the software. The route determination program and the O/S, in whole or in part, but typically the latter, are read by the processor 22, perhaps buffered within the processor 22 or within the memory 24, and then executed.

When the route determination system 10 is implemented in software running on a processor 22, as is shown in FIG. 1, it should be noted that the route determination program can be stored on any computer readable medium for use by or in connection with any computer related system or method and with any instruction execution system, apparatus, or device, such as a computer-based system, processor-containing system, or other system that can fetch the instructions from the instruction execution system, apparatus, or device and execute the instructions.

In the context of this document, a "computer-readable medium" can be any non-transitory or transitory means that can store, communicate, propagate, or transport the program for use by or in connection with the computer related system or method or with the instruction execution system, apparatus, or device, as described above. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

One representative implementation of the method for building and filtering carrier shipment routings is schematically illustrated in FIGS. 2-6 and 9-12. As shown in the schematic map 100 of FIG. 2, for example, the method generally relates to a geographic region 102 for a particular shipper or carrier that provides shipping services for freight or cargo throughout the geographic region. In one aspect the geographic region 102 serviced by the carrier can be localized, such as being limited to a particular city or metropolitan area. However, with many carriers the geographic region 102 generally comprises regional interstate shipping between a number of adjacent states throughout a particular portion of a country, or even throughout all of the states or districts within a particular country. Yet in other aspects the geographic region 102 of a carrier can comprise international shipping between countries that fall within a particular trade zone, such as Canada, the United States and Mexico with the North America Free Trade Agreement (NAFTA) or greater Europe within the European Union (EU). The geographic region 102 may also be expanded to include shipping services that may be considered part of global commerce throughout the world. Although depicted with the map 100 as a single body, the geographic region 102 need not be contiguous or continuous, and can also include portions or gaps 118 within which shipping services are not provided by that particular carrier.

As known to one of skill in the art, the geographic region 102 for a carrier is generally serviced through a network 110 of terminals 112 that are distributed throughout the geographic region 102. The terminals 112 can provide for the switching of freight between various modes of transportation (e.g. van, utility truck, semi-trailers, rail, barge, ship and air cargo, etc.), for the combination of freight loads for shipments between terminals, and for the off-loading and separation of freight loads for distribution to destination locations. The terminals 112 can also provide maintenance services for the various type of vehicles used to transport the cargo, as well as food and rest facilities for the drivers.

Figure 3:
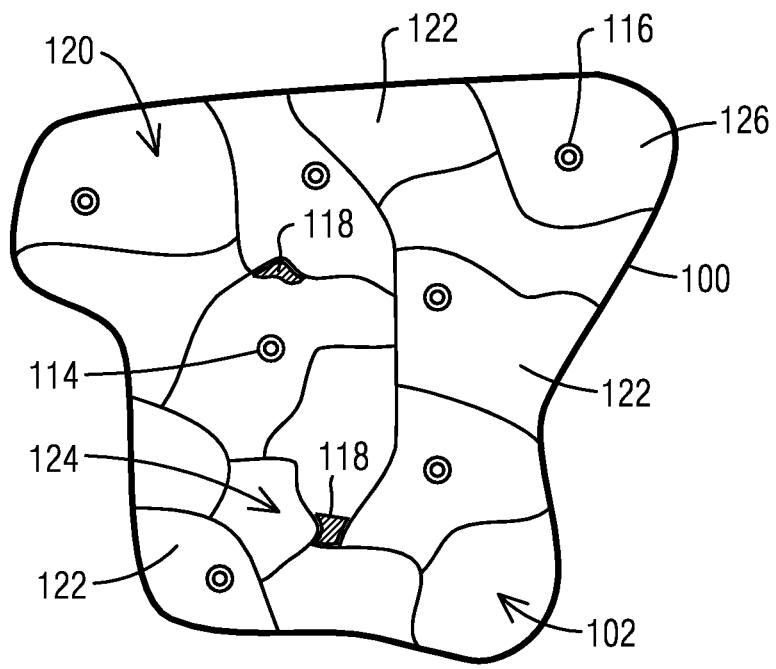
FIG. 3 is the schematic map of the geographic region of FIG. 2 that illustrates a plurality of service area polygons corresponding to a plurality of physical service areas in the geographic region.

With reference to FIG. 3, one method of the present disclosure may begin with defining, by an electronic processor, a plurality 120 of virtual service area polygons 122 that correspond to a plurality of physical service areas that together form the geographic region 102 serviced by the carrier. The service area polygons 122 that subdivide the map 100 can be virtual geospatial objects stored in PRSTGRES format in the PostgreSQL database 25 described above (FIG. 1). In addition, the software program running on the programmable computer 20 can include PostGIS functionality that allows the program to build, manage, analyze and query the GIS data.

As shown in FIG. 3, the number of service area polygons 122 that subdivide the map 100 can exceed the number of terminals 112 found in the carrier's terminal network 110, so that some of the terminals 112 can be associated with one or more neighboring service area polygons in addition to the service area polygon within which the terminal is located. In one aspect the service area polygons 122 can generally correspond to relatively large physical geographic regions that resemble the size and shape of three digit United States Census Zip Code Tabulation Area (ZCTA) polygons, and that may have initially been built up from the plurality of five digit ZCTA polygons that fall within the three digit grouping. However, even if the three digit ZCTA-like polygons are initially built up from zip code shape data, each service area polygon 122 associated with a particular carrier can be subsequently modified to more accurately reflect changes to the unique service area provided by that carrier. This can include moving a perimeter boundary to increase, decrease or re-shape the overall area bounded by the polygon, subtracting portions of the polygon to reflect a lack of similar shipping services to those removed areas, combining adjacent polygons that provide similar shipping services, or even associating the polygon with another polygon that is spaced from and non-contiguous with the first polygon.

As described in more detail below, for instance, it is not uncommon for a business or private party located at a particular address location to limit access to a small subset of the freight carriers who provide shipping services to the region. Accordingly, the present disclosure allows for the geospatial area corresponding to that address location to be excised or subtracted from the service area polygons 122 for the non-selected carriers, leaving behind a gap in their service area polygons 120 that reflects the unavailability of shipping services by those carriers to that address location. For example, FIG. 3 illustrates subtracted portions or gaps 118 in two of the service area polygons 122 that together form the map 100 of the geographic region 102 serviced by the carrier. It is to be appreciated that these gaps 118 may not be present in the service area polygons of another carrier that also provides shipping services to the same general geographic district.

Figure 4:
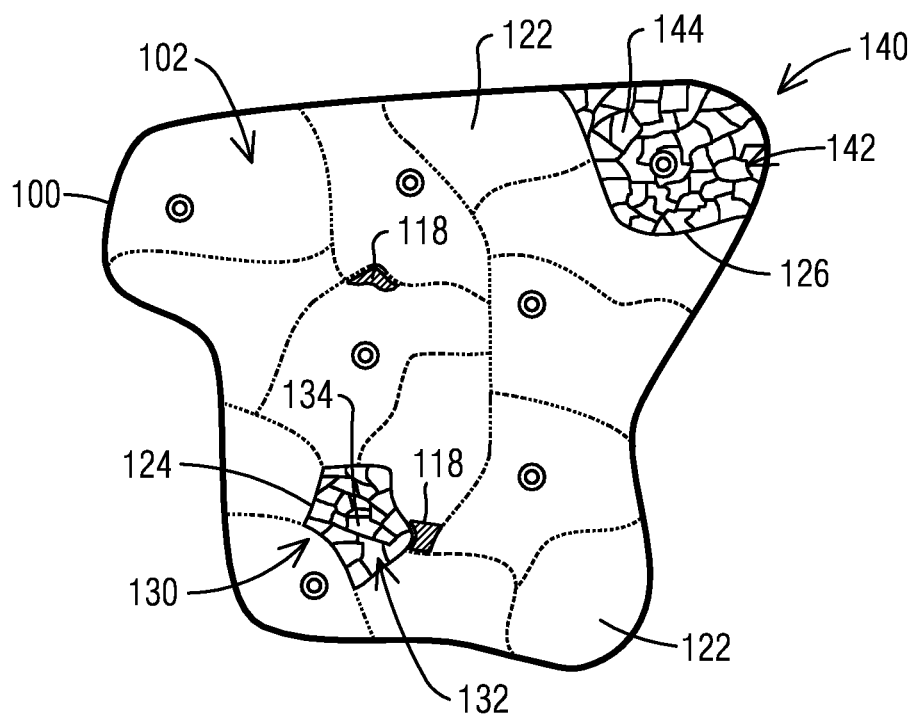
FIG. 4 is the schematic map of FIG. 3 in which two of the service area polygons are further subdivided into a plurality of smaller service area polygons.

By way of additional example, FIG. 3 also illustrates a first large service area polygon 124 that is at least partially serviced by a first terminal 114, and a second large service area polygon 126 that is at least partially serviced by a second terminal 116. In FIG. 4, it is shown that the first large service area polygon 124 can be built up from a first plurality 130 of smaller service area polygons 132 while the second large service area polygon 126 can be built up from a second plurality 140 of smaller service area polygons 142. In some representative implementations the smaller service area polygons 132, 142 can substantially correspond in size and shape to five digit United States Census Zip Code Tabulation Area (ZCTA) polygons or to five digit United States Postal Service Zip Code polygons, especially when initially formed as virtual geospatial objects stored in the geospatial database 25. As stated above, however, each of the smaller service area polygons 132, 142 associated with a particular carrier can also be subsequently modified to more accurately reflect changes to the unique service area provided by that carrier.

To avoid confusion and needless repetition, the virtual service area polygons 122, 132, 142 and their corresponding physical service areas in the geographic region 102 will hereinafter be jointly referred to as service area polygons, unless otherwise noted. Thus, it is to be understood that in the context of the computerized system and method, the service area polygons will comprise the virtual geospatial objects stored in PRSTGRES format in the PostgreSQL geospatial database 25. However, since one cannot provide shipping services between virtual objects, in the context of the actual shipping services provided by a carrier throughout a geographic region, the service area polygons will also comprise the corresponding physical or geographic service areas.

For discussion purposes, one of the polygons 132 in the first plurality of smaller service area polygons 130 in FIG. 4 can be arbitrarily designated as the origin service area polygon 134, and one of the polygons 142 in the second plurality of smaller service area polygons 140 can be arbitrarily designated as the destination service area polygon 144. It is to be appreciated, moreover, than any of the larger service area polygons 122 or smaller service area polygons 132, 142 could be the origin service area polygon, while any of the remaining larger service area polygons 122 or smaller service area polygons 132, 142 in the geographic region could be the destination service area polygon.

Figure 5:
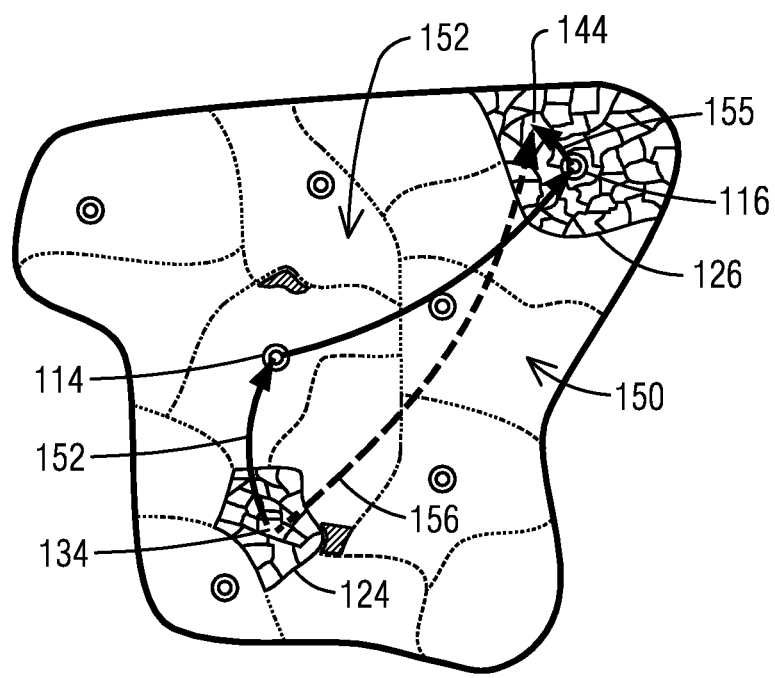
FIG. 5 is the schematic map of FIG. 4 depicting various routes between two of the smaller service area polygons.

With reference to FIG. 5, the method of the present disclosure further includes building one or more routes 150 defining an available shipping service provided by the carrier between the origin service area polygon 134 and the destination service area polygon 144. There can be multiple types of routes 150 for each carrier, including a route 152 having a transit path between the origin service area polygon 134 and the destination service area polygon 144 that includes passage through carrier's terminals 114 and 116 that service the first and second service areas, respectively. This terminal-based route 152 can comprises multiple segments, including a pick-up segment 153 between an origin location within the origin service area polygon 134 and the origin terminal 114, one or more transit segments 154 between the origin terminal 114 and the delivery terminal 116, and a delivery segment 155 between the destination terminal 116 and a destination location within the destination service area polygon 144. It will be understood by one of skill in the art that the one or more transit segments 154 between the origin terminal 114 and the delivery terminal 116 can include direct passage between the two terminals 114, 116 as well as passage through one or more intermediate terminals (not shown but described in more detail below).

Although not constrained or limited in any manner, it will also be understood that the terminal-based route 152 can be amenable to shipping service modes such as "less-than-truckload" (LTL), "household" and "small package" that generally require combining separate shipments of freight onto a single vehicle for transport between the origin terminal 114 and the delivery terminal 116. The terminal-based route 152 can also be amenable to planned changes in service modes, sub-modes or equipment that generally require transfer of the freight to a different type of vehicle or mode of transportation, as wells as "last mile" services that generally require transfer of the freight to a contracted third party carrier who completes the delivery segment 155 to the destination location within the destination service area polygon 144.

Also shown in FIG. 5, a second type of route 156 can bypass the terminals to provide a direct transit path between the first and second service areas. The direct route 156 can be amenable to shipping service modes such as "truckload" (TL) and "courier" where it may be preferable or required that the freight be loaded onto a vehicle at the origin location within the origin service area polygon 134 and transported directly to the destination location within the destination service area polygon 144 for delivery.

In defining an available shipping service between the origin service area polygon 134 and the destination service area polygon 144, each route 150 can include a predetermined set or profile of parameters that identify each of the various shipping service options that are provided by the carrier to the geographic service areas represented by the geospatial polygons 134, 144. For instance, the route parameters generally include one or more service modes or sub modes that available for collecting from substantially all of the locations with the origin service area polygon and for delivering to substantially all of the locations within the second service area polygon. A non-exhaustive list of service modes and sub modes (multi-modal) includes Air Cargo, Courier, Household, Final Mile, LTL (Less than Truckload), Ocean/FCL (Full Container Load), Ocean/LCL (Less than Container), Rail, TL/OTR (Truckload/Over The Road), TL/Intermodal, and Small Package, and the like.

The route parameters can also include an origin time window that identifies when the shipment can be picked up from substantially all of the locations within the first service area polygon, as well as a destination time window that identifies when the shipment can be delivered to substantially all of the locations with the second service area polygon. The origin time window and destination time window generally comprise the available service days in a standard 7-day week, the available service days in a 5-day work week, and/or the time of day in the available service day, such as morning, afternoon, or evening. However, other formats for the time windows are possible and considered to fall within the scope of the present disclosure.

As may be appreciated by one of skill in the art, additional route parameters that further define the shipping services provided by the carrier can include the available types of equipment (e.g. semi-truck, utility truck, van, etc.), the type of commodity for which shipping services can be provided (e.g. farm products, forest products, petroleum products, furniture, leather products, metal products, etc.), and the class of goods for which shipping services can be provided (e.g. cereal grains, milled grains, alcoholic beverages, machinery, precision instruments, etc.). If desired, the route parameters can also include overall weight, volume or density constraints on the shipment. In one aspect the route parameters can also include the availability of particular accessorial services at the origin or destination locations, such as the availability of a vehicle with a lift gate, specialized loading equipment, personnel for loading/unloading, residential access, and the like).

The route parameters can further include the transit path and the transit time between the origin service area polygon and the destination service area polygon. The transit path can comprise a terminal-based route 152 or a direct route 156 (as described above), hybrid routes that comprise various combinations of the two, as well as other route types as may be known to one of skill in the art. The transit time can comprises the predetermined time in transit (e.g. the number days in transit) that is scheduled in advance for shipping the freight between substantially all of the locations with the origin service area polygon 134 and the destination service area polygon 144. The value for the transit time can take into consideration the other route parameters, such as service mode or sub mode, transit path, equipment type, cargo/commodity type, class of goods, accessorial services, and the like. In one aspect the transit time can be provided in units of "days", indicating the number of scheduled business days or travel days between the origin service area polygon and the destination service area polygon when following the transit path. In addition, the transit time may also be variable in accordance with a pre-defined class of service, such as standard service, priority (expedited service), weekend service, or guaranteed service.

Figure 6:
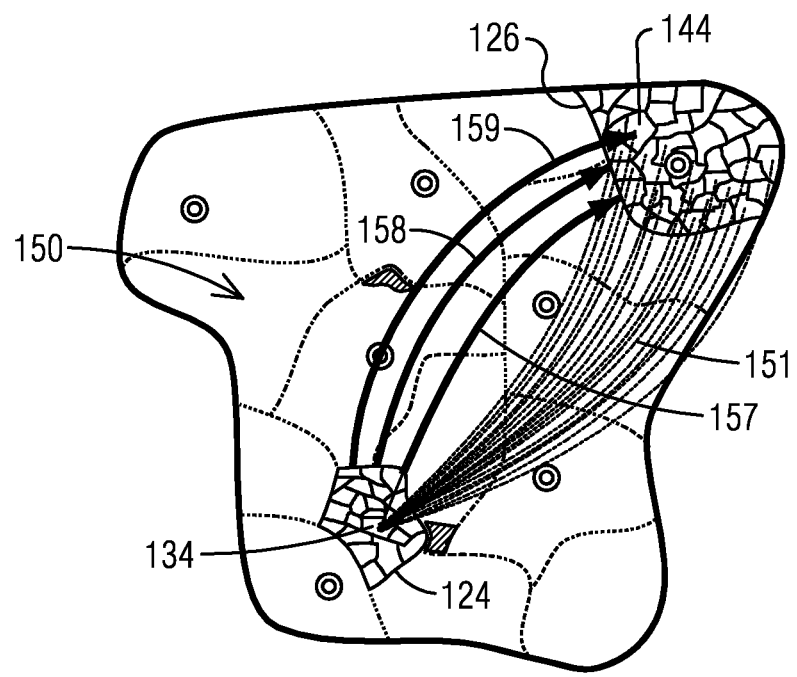
FIG. 6 is the schematic map of FIG. 4 depicting addition variations on routes between two of the smaller service area polygons.

In building the routes 150 between the origin service area polygon 134 and the destination service area polygon 144 for the carrier providing shipping services throughout the geographic region 102, the routes 150 can be formed with a customizable level of granularity that can be as narrowly or as broadly defined as desired. For instance, as shown in FIG. 6, a plurality of individual routes 151 can be created between the first smaller service area polygon 134 and each of the smaller service area polygons 142 located within the large service area polygon 126, including the second smaller service area polygon 144. In this representative example, each of the individual routes 151 can be customizable with its own individual set of route parameters, including but not limited to differences in the available service modes, origin time windows, destination time windows, transit paths, transit times, the availability of particular accessorial services, etc., as described above.

When the available shipping services are substantially the same for similar groups of smaller service area polygons (such as with a standardized profile of shipping services provided by a particular carrier), and having the same transit time and transit path (e.g. through the same terminals), the smaller area polygons can be combined together into larger service area polygons so as to reduce the number of routes required to define all of the available shipping options for the carrier. Also illustrated in FIG. 6, for instance, in one aspect a route 157 can be built between the smaller origin service area polygon 134 and the second larger service area polygon 126 (that includes all of the second plurality 140 of smaller service area polygons 142, including the destination service area polygon 144). In another aspect, a route 159 can be built between the first larger service area polygon 124 (that includes all of the first plurality 130 of smaller service area polygons 132, including the origin service area polygon 134) and the smaller destination service area polygon 144. In yet another aspect, a route 158 can be build between first large service area polygon 124 (that includes the first plurality 130 of smaller service area polygons 132, including the origin service area polygon 134) and the second large service area polygon 126 (that includes the second plurality 140 of smaller service area polygons 142, including the destination service area polygon 144).

To further illustrate the formation of the routes, FIG. 7 is a route table 200 depicting various representative routes 202 and route permutations between three similar large service area polygons (generally referenced as "xx_363", "xx_381", "xx_452") and two smaller service area polygons (generally referenced as "xx_46001" and "xx_46038"), with the shipping services between the service area polygons being provided by at least two separate carriers (CR01, CR02). In accordance with one representative format for the routes 202, each route or route definition can comprise a line of data fields formatted with a predetermined sequence that identifies the carrier, an origin service area polygon for that carrier, and a destination service area polygon, along with the various additional route parameters that specify each of the various shipping service options that are provided by the carrier to the geographic service areas represented by the origin and destination geospatial polygons, as described above. Furthermore, each of the routes 202 may be created with the computer program running on the computer 20 and stored in electronic format in the route database 25 (see FIG. 1).

The route table 200 of FIG. 7 and FIGS. 8A-8C can be used to illustrate several aspects of the routes 202. For example, with route 204 in table 200 that is shown in isolation in FIG. 8A, the first field in the line of data fields can comprise a carrier identifier 210 that identifies which of the carriers, in this case carrier CR01, that is associated with that route. The second data field can include the reference identifier 212 for the origin service area polygon (i.e.

01_363) that forms a portion of the carrier's geographic region of service. Similarly, the third data field can include the reference identifier 214 for the destination service area polygon (i.e. 01_381) that also forms a portion of the carrier's geographic region of service. As illustrated in the route table 200, each of the service area polygons generally serves as the origin polygon or the destination polygon for a number of routes, or simultaneously both the origin and destination polygon for the route in which the origin location and destination location fall within the same service area polygon.

The reference identifiers 212, 214 for the service area polygons can be a number or a name that is generally associated with that specific portion of the geographic region, such as the one of the major zip codes, the name of a city, the name of the nearest shipping terminal, the name of prominent landmark, the name of a region of a particular state, and the like. For the route 204 depicted in FIGS. 7 and 8A, for example, the reference identifiers for the service area polygons 01_363 and 01_381 for carrier CR01 may substantially correspond to 303 and 381 three-digit ZCTA zip codes in Alabama and Tennessee, respectively. In one aspect the service area polygons 01_363 and 01_381 may also be initially built up from a plurality of smaller service area polygons that substantially correspond in size and shape to the five digit ZCTA polygons that fall within the 303 and 381 three-digit ZCTA groupings. Nevertheless, as discussed above, either or both of the 01_363 and 01_381 polygons for carrier CR01 can be uniquely-shaped service area polygons that do not precisely align with the government-defined shape data for the 303 and 381 three-digit ZCTA zip code, as each carrier is able to alter or modify the virtual geospatial objects to more accurately reflect unique changes to the geographic service area provided by that carrier, including moving a perimeter boundary to re-shape the overall area bounded by the polygon, subtracting portions of the polygon, combining adjacent polygons, and the like.

As route 204 of FIG. 8A is between two larger service area polygons that have both been built up from a plurality of smaller service area polygons having substantially the same service area parameters, route 204 may be considered analogous to the route 158 depicted in FIG. 6.

In addition to the service area polygon reference identifiers 212, 214, the route 204 can also include a data field 216 for the transit path between the origin service area polygon 212 and the destination service area polygon 214, and a data field 218 for the transit time along the transit path between the origin service area polygon and the destination service area polygon. In one aspect the transit path 216 can designate the origin terminal (e.g. CR01|CITY_A|AL) and destination terminal (e.g. CR01|CITY_B|TN) for carrier CR01, as may be in keeping with a terminal-based route. For a direct route the transit path may alternatively include the origin and destination service area polygon reference identifiers without designating the origin and destination terminals Other route definition formats or methodologies are also possible and considered to fall within the scope of the present disclosure. In this representative example, the transit time 218 along the transit path between the origin service area polygon 212 and the destination service area polygon 214 is two days.

The route 204 of FIG. 8A can also include data fields for an origin time window 220 that designates the availability of the shipping service for picking up a shipment from substantially all of the locations within the origin service area polygon 212, as well as a destination time window 222 that designates the availability of the shipping service for delivering a shipment to substantially all of the locations within the destination service area polygon 214. For the representative route 204, both the origin time window 220 and the destination time window 222 comprise the first five service days of the work week (i.e. "12345" can be a numerical designation for Monday, Tuesday, Wednesday, Thursday and Friday).

The sequence of data fields in the table 200 (FIG. 7) that define the route 204 (FIG. 8A) may also include a data field 228 for defining one or more available service modes and sub-modes. In the example route 204 the service mode is LTL, or Less Than Truckload. In one aspect the computer program may be configured so that the LTL designation indicates the availability of the LTL service mode and anything smaller, such as courier mode and household mode, etc. In other aspects the LTL designation may only include the LTL service mode, with other the other available service modes being added to the data field separately.

Furthermore, the sequence of data fields in the table 200 that define the routes 202 may extend beyond those fields shown in FIGS. 7 and 8A-8C to include one or more of the additional route parameters described above. These may include, but are not limited to, the available types of equipment, the class of goods or type of commodity for which shipping services can be provided, the overall weight, volume or density of the cargo, the availability of particular accessorial services, the available classes of service, and the like.

Representative route table 200 also includes a route definition 206 for another carrier CR02, shown in isolation in FIG. 8B. Route 206 is provided by carrier CR02 between a larger origin service area polygon 02_363 that is serviced by terminal "CR02|CITY_A|AL" located in Alabama, and a smaller destination service area polygon 02_46038 that is serviced by terminal "CR02|CITY_D|IN" located in Indiana. The origin service area polygon 02_363 for carrier CR02 can be similar to or different from the origin service area polygon 01_363 for carrier CR01 used in route 204. However, for the purposes of the example the two service area polygons at least partially overlap so that an origin location provided by a user, as described in more detail below, can fall within the geographic service areas provided by both carriers. As route 206 is between a larger service area polygon 02_363 and a smaller service area polygon 02_46038, route 206 may be considered analogous to the route 159 depicted in FIG. 6.

It is notable that in addition to the origin terminal "CR02|CITY_A|AL" and the destination terminal "CR02|CITY_D|IN", the transit path 236 for route 206 also includes an intermediate terminal "CR02 CITY_B|TN" that can define the transit path as passing through Tennessee, and possibly stopping at the intermediate terminal in CITY_B to offload, transfer or take on additional cargo. It will be appreciated that many of the routes in the route database can include one or more intermediate terminals along their transit paths, especially those that extend for longer distances.

It is further notable that the destination time window 242 for route 206 specifies that the service days for delivering a shipment to substantially all of the locations within the smaller destination service area polygon 02_46038 is limited to three days of the week: Monday, Wednesday and Friday. Thus, even though the predetermined transit time 238 between locations in the origin and destination service areas is two days, the delivery of the shipment to the destination location may be delayed an extra day if it arrives at the destination terminal after the cutoff time for delivery on the previous day of service.

Representative route table 200 in FIG. 7 also includes a route 208, shown in isolation in FIG. 8C, that is provided by carrier CR01 but which for one reason or another utilizes a different carrier, such as CR02, to make the final delivery within the destination service area polygon. This partnering arrangement may generally be known as "final mile" service and identified in the "Direct Code" data field 264 as "P" for partnership. For example, in some circumstances carrier CR01 may not yet have expanded its network of terminals to include the smaller destination service area polygon 46038, while carrier CR02 provides service to the geographic service area on a limited basis. Alternatively, delivery and pick-up shipping services to the geographic service area corresponding to service area polygon 46038 may be limited to carrier CR02 by the property owner or manager, even though carrier CR01 is able to provided shipping services to all the surrounding areas. Rather than forgo the shipping market to the 46038 service area, carrier CR01 may contract with carrier CR02 to deliver shipments to at least portions of carrier CR02's destination service area polygon 02_46038. In one aspect carrier CR02 may only provide a partnering service to carrier CR01 for select portions of its geographic service area 02_46038, so that carrier CR01's 01_46038 service area polygon that is designated in route 208 may only overlap carrier CR02's 02_46038 service area polygon that is designated in route 206 for those selected portions, even though the service to both the 02_46038 and 01_46038 service areas is provided by carrier CR02.

As illustrated in the transit path date field 256 for route 208, the transit path from the 01_363 origin service area polygon in Alabama can begin with origin terminal "CR01|CITY_A|AL", continue through carrier CR01's intermediate terminal "CR01|CITY_B|TN" in Tennessee, after which it is transferred to carrier CR02's destination terminal "CR02|CITY_D|IN" in Indiana. In one aspect the transfer between carriers can add a day to the transit time, which can be three days for route 208, as compared to a similar shipment carried directly (identified in the "Direct Code" data field 244 as "D" for direct) along transit path 236 for route 206 using only carrier CR02 terminals that may only take two days.

Figure 9:
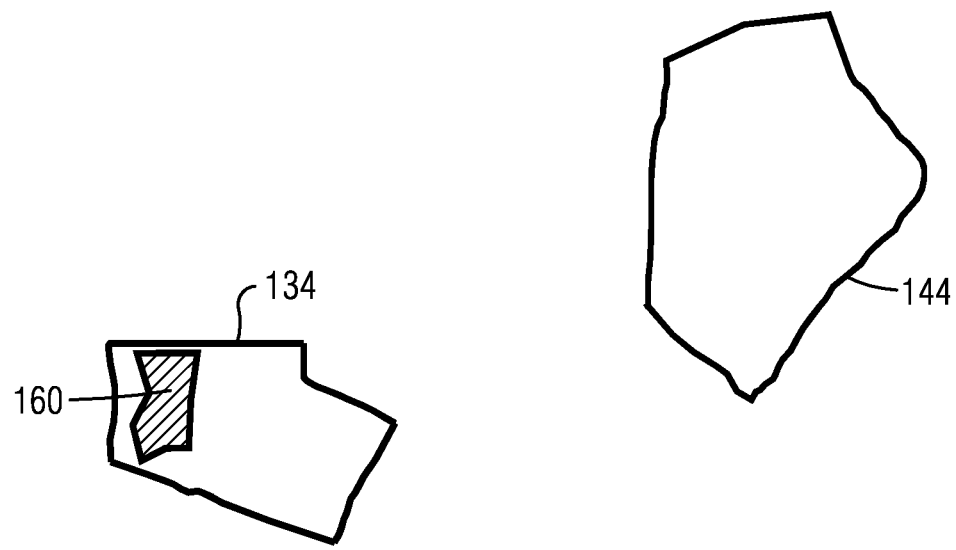
FIG. 9 is a schematic diagram of the origin and destination service area polygons of FIGS. 4-6 in isolation, with a route guide polygon overlying one of the service area polygons.

The representative origin service area polygon 134 and destination service area polygon 144 of FIGS. 4-6 are shown in isolation in FIGS. 9-12. As described above, the smaller service area polygons 134, 144 can be virtual geospatial objects that correspond to the physical or geographic service areas that form a portion the geographic region 102 serviced by a particular carrier. As shown in FIG. 9, the origin service area polygon 134 may also include a route guide polygon 160 that overlies or coincides with a portion of the service area polygon, and that includes one or more restrictions that further limit the available shipping services from (or to) the covered portions of the origin service area polygon 134. Thus, although service area polygon 134 is designated as an origin polygon in the example, it is understood that route guide polygons that overlie or coincide with destination service area polygons can have the same application and effect regardless of the direction of the shipment.

Similar to service area polygons, route guide polygons can also be a virtual geospatial objects (i.e. stored in PRSTGRES format in the PostgreSQL database 25 shown in FIG. 1) that correspond to the geographic area or locations that fall within the boundary defined by the route guide polygon. In one aspect, the restrictions included in the route guide polygons can be limitations on one or more of the route parameters included in the route definitions that designate the underlying service area polygon. These restrictions can include, but are not limited to, limitations in the origin or destination time window (depending on whether the underlying service area polygon is designated in the route as an origin or destination polygon), the service mode or sub-mode, the available types of equipment, the class of goods or type of commodity for which shipping services can be provided, the overall weight, volume or density of the freight for which shipping services can be provided, the availability of particular accessorial services, the availability of different classes of service, and the like. In some aspects the restriction can also be an additional fee or tariff that is charged to the carrier or to the user for picking up or delivering a shipment from the geographic area or locations that fall within the route guide polygon. In other aspects the tariffs can be rate tables or schedules that vary with the size, weight, or bulk characteristics of the shipments, or charges for accessorial services that require special equipment or dedicated personnel to load or unload the shipment.

The nature of the restriction can also vary based of the source of the restriction, such as whether the route guide polygon and its restrictions are carrier-based or location-based. If the restrictions are carrier-based, for instance, the restrictions can be reductions in the availability of shipping services that are otherwise provided by that carrier to the rest of the locations that fall within the underlying service area polygon. Examples can include special limitations in the equipment that can be used to collect the shipments because of carrier-specific access issues at the origin locations, special carrier-specific limitations on the time of day for delivery or pick-up, additional fees to travel to and from certain portions of the geographic service area, and the like. Carrier-based route guide polygons generally apply to the service area polygon for that carrier, and can be useful for modifying the available shipping services provided by the carrier at those locations without subdividing the service area polygon into multiple smaller service area polygons that require additional routes with different profiles of available shipping services.

Alternatively, if the restrictions in the route guide polygon are location-based, the limitations can be requirements that apply to all of the service area polygons provided by the various carriers that service those locations. Examples can include special restrictions on the equipment that can be used to collect the shipment because of location-specific access issues at the origin location, including those imposed by municipal ordinances, special location-specific limitations in the time of day for delivery or pick-up, location-specific tariffs to gain access to the origin or delivery locations, location-specific restrictions of shipping services to a select few carriers who have received prior approval for delivery or pick-up on particular days of the week, and the like.

In one aspect the route guide polygons can also include searchable identifiers that provide indication of the type of limitation or restriction embodied in the route guide polygon, the identity of the carrier that is affected by a carrier-based route guide polygon, the nature or type of facility that is covered by a location-based route guide polygon, and the like. For example, a location-based route guide polygon can often be applied to schools and churches which requires that the delivery or pick-up service includes a lift-gate for shipments that exceed a predetermined weight or size limitation. This is because these types of locations rarely have dock facilities for loading or unloading large loads. By including searchable identifiers with the route guide polygons that allow these virtual geospatial objects to be queried and tabulated, a user can apply the route determination system to obtain detailed and precise information relating to their service areas that may allow them to better control costs or capture lost revenue. Using the example described above, for instance, a user could search the listings of route guide polygons within a certain region to identify all the school and/or churches within that region that require a lift-gate service for all shipments heavier than a predetermined weight or larger than a predetermined size, and use that information to better allocate resources to meet this restriction. The user could also add a special tariff to these particular route guide polygons that covers the cost of providing this additional service.

Upon the formation of the various service area polygons that correspond to the geographic service areas served by a shipping carrier, the formation of the various route definitions that define the shipping services between each pair of service area polygons, and the formation the various route guide polygons that further limit the available shipping services at predetermined locations within the service area polygons, the method generally continues with receiving a shipping request query from a user for collecting a shipment of goods at an origin address location during a user-defined pick-up time range and delivering the shipment of goods to a destination address location. In one aspect the origin address location and destination address location can be street address locations.

Upon receiving the origin address location and the destination address location, the method continues with converting the origin address location to an origin latitude/longitude or geospatial location and the converting destination address location to a destination latitude/longitude or geospatial location. In one aspect this conversion function can take place in the one or more of the electronic processors 22 of the route determination system 10, with the electronic processors 22 having access to conversion data that is stored in memory in one or more databases. In another aspect, the conversion function can take place through a third-party address-to-latitude/longitude conversion service 30 that is remote from the route determination system 10 but accessible via an internet connection 31, as outlined in FIG. 1. In this case the method can include the steps of directing the origin address location and the destination address location in electronic format to the address-to-latitude/longitude conversion service to convert the address locations to an origin latitude/longitude location and a destination latitude/longitude location, respectively, followed by receiving the origin latitude/longitude location and a destination latitude/longitude location in electronic from the address-to-latitude/longitude service. As indicated above, in one aspect the address-to-latitude/longitude conversion service 30 can comprise the Google Places® API that is accessed by the processor 22 via an internet connection 31.

In accessing the third-party address-to-latitude/longitude conversion service 30, it is possible to include a window for the conversion service's data entry fields within the graphical interface for the route determination program running on the electronic processor 22. This can allow for the user to enter the origin address location and the destination address location for the shipping request query directly into the conversion service's data entry fields, thereby speeding the data entry process. In addition, the conversion service's data entry fields may also include auto-complete functionality that can automatically completes or corrects the address location in the data entry fields with accurate address information for substantially all of the address locations within the carrier's geographic region.

Once the route determination program is in possession of the origin latitude/longitude or geospatial location and the destination latitude/longitude or geospatial location for a desired shipping service, the route determination program running on the processor 20 can then query the route database 25 to geospatially determine or identify all of the routes within the route database 25 that have the origin latitude/longitude location included within its origin service polygon and the destination latitude/longitude location included within its destination service polygon. The route determination program can also query the route database 25 to geospatially determine or identify all of the route guide polygons that include either of the origin latitude/longitude location or the destination latitude/longitude location within its geographic boundaries.

Figure 10:
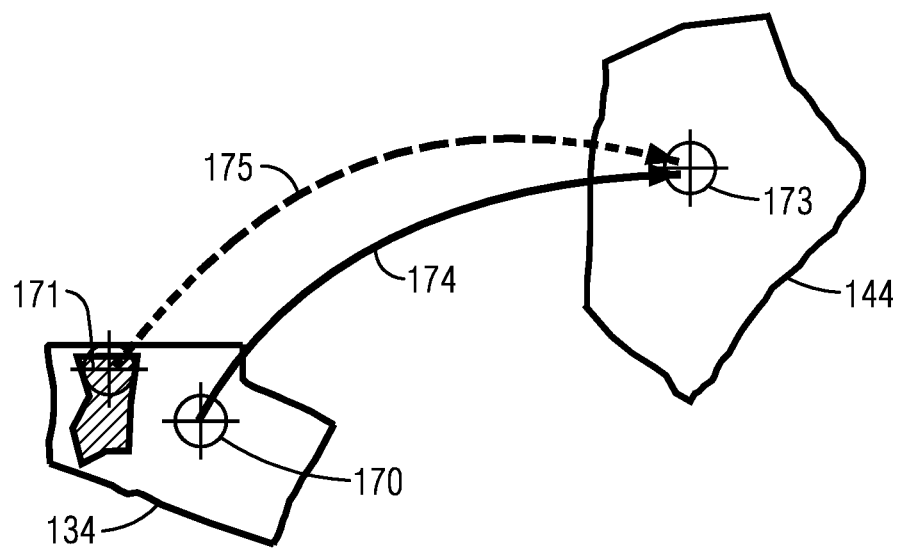
FIG. 10 is a schematic diagram of the origin and destination service area polygons of FIG. 9, depicting various routes between an origin location in the origin service area polygon and a destination location the destination service area polygon.

A simplified example of the geospatial determination process is provided in FIG. 10, which illustrates the representative results provided by two hypothetical queries of the virtual geospatial objects (i.e. the service area polygons and the route guide polygons) in the route database 25. For the first query, the origin latitude/longitude location 170 falls within the boundary of the origin service area polygon 134 and the destination latitude/longitude location 173 falls within the boundary of the destination service area polygon 134, with the route 174 defining the available shipping service from the origin polygon 134 to the destination polygon 144 for one particular carrier. As neither the origin latitude/longitude location 170 nor the destination latitude/longitude location 173 falls within a route guide polygon, the available shipping service provided by the carrier (as defined by the route 174) can be presented to the user without modification as an available option for transporting the shipment from the origin address location to the destination address location with pick-up at the date and time specified by the user.

For the second query illustrated in FIG. 10, a new origin latitude/longitude location 171 falls within the boundaries of both the origin service area polygon 134 and the route guide polygon 160. Consequently, the route determination program running on the processor 20 can then modify or limit the available shipping service initially defined by the route 174 in accordance with the one or more restrictions included in the route guide polygon 160. Depending upon the nature of the restrictions and how the restrictions match with additional shipment parameters provide by the user, a modified shipping service 175 provided by that carrier can be presented to the user as an available option for transporting the shipment from the origin address location 171 to the destination address location 173. Also, in circumstances where the user's shipping request query happens to avoid the restriction imposed by the route guide polygon 160, an un-modified shipping service 174 may still be available, even at the new origin latitude/longitude location 171. However, if the route definition 174 is not able to avoid the restriction imposed by the route guide polygon 160 or is not amenable to a modification that allows the shipping service to meet the requirements of both the route guide polygon 160 and the user's request, the route 174 provided by that particular carrier can then be automatically filtered out or eliminated from the list of available options presented to the user for transporting the shipment.

Figure 11:
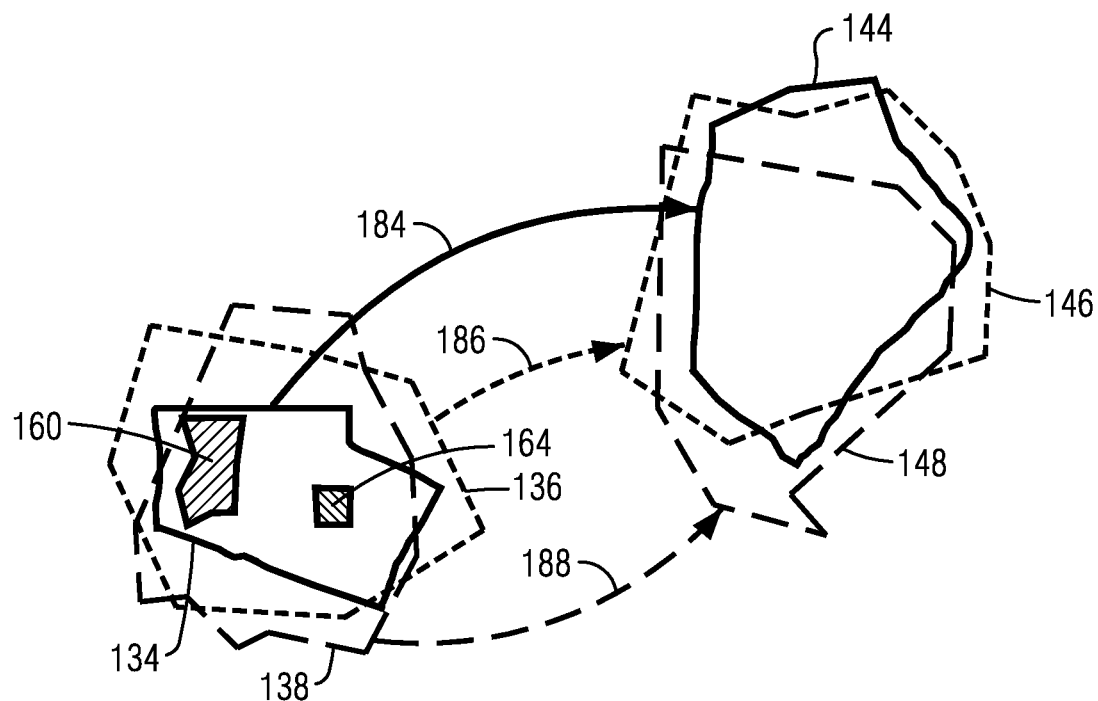
FIG. 11 is a schematic diagram of the origin and destination service area polygons for the first carrier of FIG. 9 and for two additional carriers.
Figure 12:
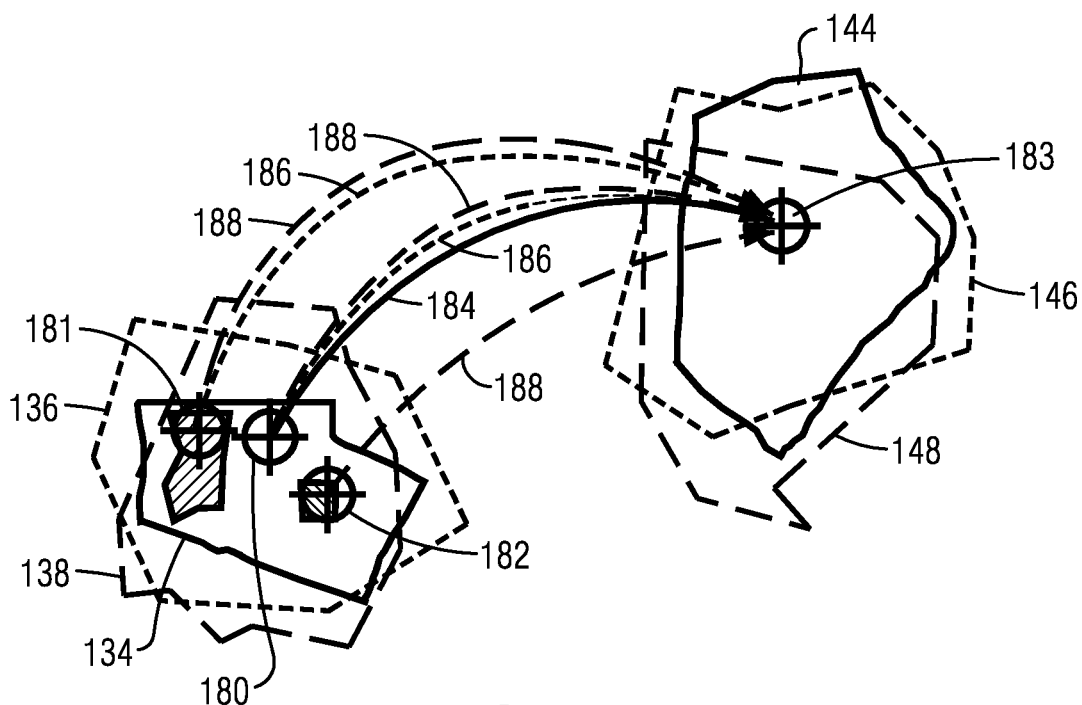
FIG. 12 is a schematic diagram of the origin and destination service area polygons of FIG. 11, depicting various routes between origin locations falling within each of the origin service area polygons and a destination location falling within each of the destination service area polygons.

Another illustration of the route determination system 10 and methods is provided in FIGS. 11 and 12, which illustrate the shipping services provided by three carriers between overlapping geographic service areas. As shown in FIG. 11, a first carrier provides a route 184 between an origin service area polygon 134 and a destination service area polygon 144, a second carrier provides a route 186 between an origin service area polygon 136 and a destination service area polygon 146, and a third carrier provides a route 188 between an origin service area polygon 138 and a destination service area polygon 148. The origin service area polygon 134 for the first carrier includes a carrier-specific route guide polygon 160 that limits the available shipping services provided by the first carrier for the geographic area or all of the address locations that fall within the route guide polygon 160. In addition, a location-specific route guide polygon 164 that affects all three carriers is also present within the region that is overlapped by all three origin service area polygons 134, 136, 138.

For a first query illustrated in FIG. 12, the origin latitude/longitude location 180 falls within the boundaries of each of the origin service area polygons 134, 136, 138 and the destination latitude/longitude location 183 falls within the boundaries of each of the destination service area polygons 144, 146, 148. As neither of the origin and destination latitude/longitude locations falls within a limiting route guide polygon, each of the available shipping services provided by the carrier (as defined by the routes 184, 186, 188) are presented to the user without modification as available options for transporting the shipment from the origin address location 180 to the destination address location 183 with pick-up at the date and time specified by the user.

For a second query also illustrated in FIG. 12, a new origin latitude/longitude location 181 also falls within the boundaries of each of the origin service area polygons 134, 136, 138 while the destination latitude/longitude location 183 remains unchanged. However, the second origin latitude/longitude location 181 also falls within route guide polygon 160 that limits the shipping services provided by the first carrier. If the route 184 provided by the first carrier does not avoid the restriction imposed by the route guide polygon 160 or is not amenable to a modification that allows for the shipping service to meet the requirements of both the route guide polygon 160 and the user's request, the route 184 may be automatically filtered out or eliminated during the query and the available shipping services provided by each of the remaining carriers (as defined by the routes 186, 188) can be presented to the user as available options for transporting the shipment.

For a third query shown in FIG. 12, a third origin latitude/longitude location 182 also falls within the boundaries of each of the origin service area polygons 134, 136, 138 while the destination latitude/longitude location 183 unchanged. However, the origin latitude/longitude location 182 now falls within the location-based route guide polygon 164 that could potentially limit the shipping services provided by all three carriers. In this example neither the route 184 provided by the first carrier nor the route 186 provided by the second carrier is able to avoid the restriction imposed by the route guide polygon 164, nor are the routes 184, 186 amenable to a modification that would allow for their shipping services to meet the requirements of both the route guide polygon 164 and the user's shipping request. However, the route 188 provided by the third carrier is either able to avoid the restriction or is amenable to modification. Accordingly, both the routes 184, 186 provided by both of the first and second carriers can then be filtered out or eliminated during the query, and only the shipping service provided by the third carrier (as defined by the third route 188) may be presented to the user as available for transporting the shipment.

In accordance with yet another representative implementation, FIG. 13 is a representative screen shot 300 of the results of a shipping request query by a user as may be entered into the route determination system 10 of FIG. 1. The shipping request query generally includes an origin address location 310 (e.g. "Address A"), a destination address location 312 (e.g. "Address B"), a pick up date 314, and a pick up time 315. In one aspect the shipping request query may also include additional user-defined parameters 316 that allow the user to further specify the parameters of the shipping request, which can have the affect of limiting the available shipping service options.

The results of the shipping request query can be presented in a results field 320 that provides a list of each available route (in this case route listings 330, 340, 350, 360, 370) that meet the requirements of the shipment request. As illustrated, each route listing 330 can indicate the carrier 332, a transit time 336 and a transit distance 337, and a delivery date 338 for transporting the shipment between Address A and Address B. Furthermore, in one aspect the route listing 330 can also indicate an origin terminal 334 and a destination terminal 335 that may specify the route path of the shipment between Address A and Address B. Depending on the completeness of the shipment information that is entered into the route determination program, each route listing 330 can also include a price 333 for the shipping service provided by that carrier, as well as the contact information for the carrier 339. In one aspect of the route determination system, the overall number of route listings can change as the shipment information is entered into the route determination program, as some of the routes can become unavailable for completing the shipment request. In addition, pricing 333 will generally not be provided with the route listings until all of the necessary information for completely characterizing that shipment is entered by the user. As will be appreciated by one of skill in the art, moreover, each of the route listings 330, 340, 350, 360, 370 can be further modified to provide more or less detail regarding the specifics of the available shipping service between the origin address locations 310 and destination address locations 312.

A close review of FIG. 13 reveals that each of the carriers CR01, CR02, CR03, CR04 and CR05 represented in the route listings 330, 340, 350, 360, 370 includes within its stored data set an origin service area polygon for that carrier that corresponds to a geographic service area generally located in or around Dothan, Ala. In addition, it is also understood that the latitude/longitude location for the origin address location 310 also falls within the boundaries of the origin service area polygons for each of the carriers.

Figures 14, 15:
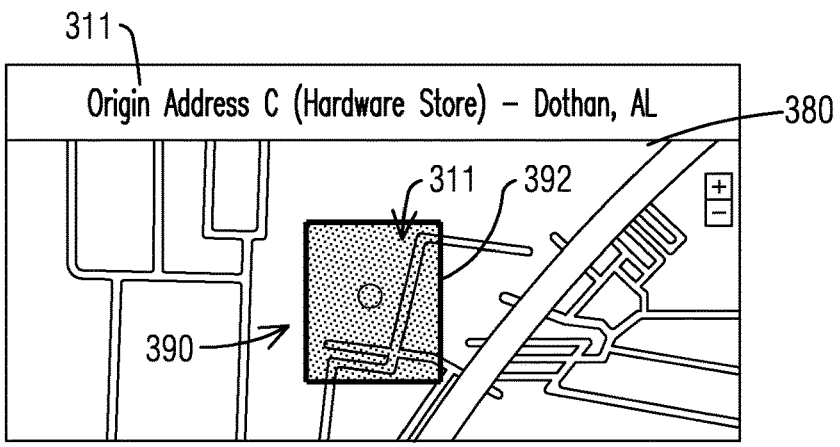
FIG. 14 is a representative screen shot of the creation of a route guide polygon using a mapping service.
FIG. 15 is a representative screen shot of the results of the shipping request query of FIG. 13 after application of the route guide polygon of FIG. 14.

In yet another representative implementation of the route determination system and methods that is illustrated in FIGS. 14-15, a second origin address location 311 (e.g. "Address C") can be substituted into the shipping request query of FIG. 13 for origin Address A. For illustrative purposes, Address C can be separate from but near to Address A of FIG. 13 and can also fall with the boundaries of each origin service area polygon of carriers CR01, CR02, CR03, CR04 and CR05. However, in this example Address C can be a local store of a national chain of home improvement stores (or any other type of commercial enterprise) that has recently entered into an exclusive contract with just one carrier, in this case carrier CR01, to provide all the shipping services to the store located at Address C for the national chain. To prevent future attempts to collect or deliver goods at Address C by a non-contracted carrier, a user of the route determination system 10 can direct the processor 22 of the computer 20 to access a mapping service 34 (FIG. 1) and create a new route guide polygon 390 that limits the available providers of shipping services at Address C to carrier CR01.

As shown in FIG. 14, in one aspect the new route guide polygon 390 can be created graphically within the mapping service by establishing a boundary 392 around the second address location 311 to define the virtual geospatial object, and then associating the carrier restriction with the virtual geospatial object to complete the route guide polygon 390. The route guide polygon 390 can then be added to the route database 25 (FIG. 1). Similar to the third-party address-to-latitude/longitude conversion service 30 described above, it is possible to include a window for the mapping service 34 within the graphical interface for the route determination program running on the electronic processor 22. This can allow for the user to draw the boundary 392 for the route guide polygon directly within the mapping service's graphical data entry field, thereby improving the speed and accuracy of the data entry process and the formation of the route guide polygon 390. In one representative implementation the mapping service 34 can be the Google Maps® API that is accessed by the processor 22 via an internet connection 31.

FIG. 15 is representative screen shot 302 of the altered shipping request query in which the first origin address location 310, Address A, has been replaced by the second origin address location 311, Address C, while leaving the destination address 312, Address B, the pick up date 314 and pick up time 315 and the remainder of user-defined parameters 316 substantially unchanged. As can be seen, the route listings for carriers CR02, CR03, CR04 and CR05 have been automatically filtered out or eliminated, leaving the listing for carrier CR01 as the only available option for shipping from the second origin address location 311.

Figure 16:
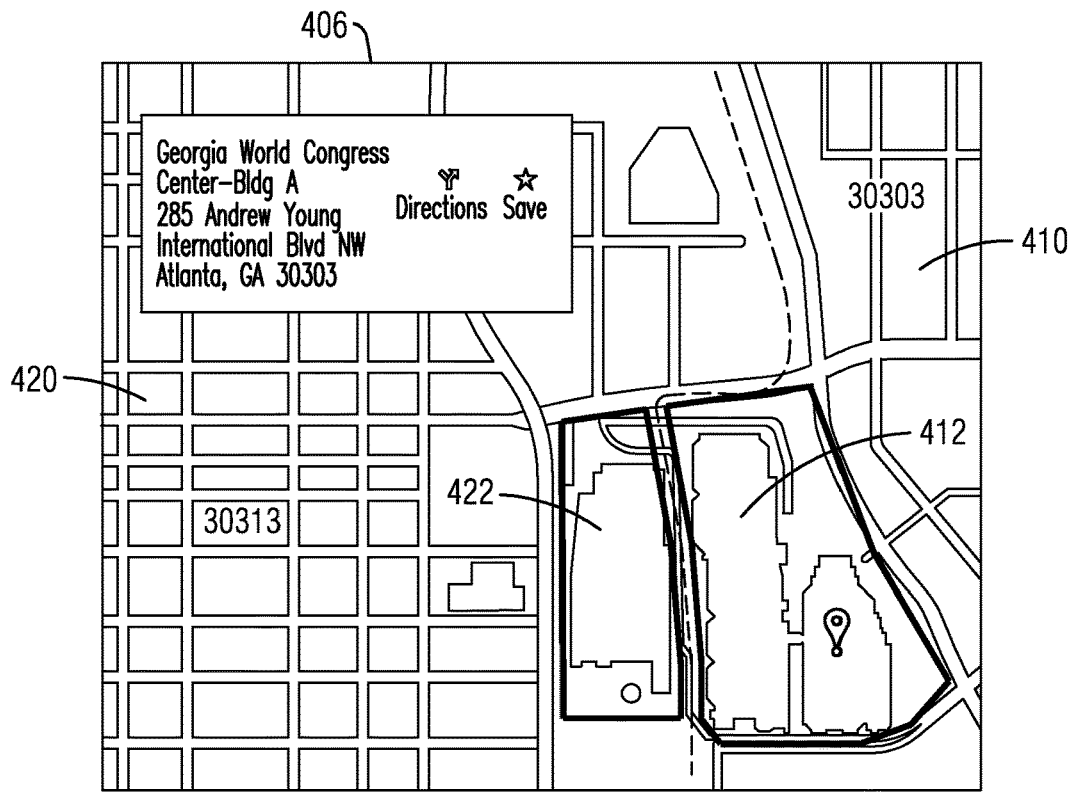
FIGS. 16 and 17 are maps of example service area polygons corresponding to the geographic service areas for two carriers, in accordance with another representative implementation.

In accordance with another representative implementation of the present disclosure, FIG. 16 is a representative map and FIGS. 18 and 19A-19B are representative route tables 400, 402, 404 for several hypothetical service area polygons corresponding to the geographic service areas 410, 412, 420, 422 for two carriers in and around the Georgia World Congress Center located in Atlanta, Ga. As illustrated in FIG. 16, these locations can fall on the boundary between the 30303 zip code-based geographic service area 410 and the 30313 zip code-based geographic service area 420. In this example, both the 30303 geographic service area 410 and the 30313 geographic service area 420 can be included within an "01_Atlanta" service area polygon for a first carrier CR01, as shown in isolation within route table 402 (FIG. 19A). Similarly, both the 30303 geographic service area 410 and the 30313 geographic service area 420 are also included within an "02_Atlanta" service area polygon for a second carrier CR02, as shown in isolation within route table 404 (FIG. 19B). Furthermore, as indicated in the transit path 450 for the route table 402 and transit path 470 for the route table 404, the "01_Atlanta" service area polygon is generally serviced by the "CR01|Atlanta|GA" terminal while the "02_Atlanta" service area polygon is generally serviced by the "CR02|Atlanta|GA" terminal.

As noted in route tables 400, 402, 404, the available shipping services to and from the Georgia World Congress Center can be substantially different from those provided to the surrounding locations in the 30303 and 30313 geographic services areas, so much so that the Georgia World Congress Center may be divided into two geographic service areas 412 and 422 that are both associated with unique service area polygons for each carrier. This can lead to the formation of the 01_GWCC_A and 01_GWCC_C service area polygons for carrier CR01 (FIG. 19A), and the 02_GWCC_A and 02_GWCC_C service area polygons for carrier CR02 (FIG. 19B).

In one aspect shown in FIG. 19A, the service days 454 for Buildings A and B of the Georgia World Congress Center (01_GWCC_A) for carrier CR01 may be limited to Monday, Tuesday and Thursday, while the service days for Building C (01_GWCC_C) for carrier CR01 may be limited to Monday, Wednesday and Friday. In yet another aspect, carrier CR02 may not deliver directly to either Georgia World Congress Center geographic service area 412, 422, and can thus utilize a partnering arrangement with carrier CR01 to deliver or pick up shipments from those two service areas, as shown in the transit path 470 of FIG. 19B.

The route determination system and method illustrated in FIGS. 16, 18 and 19A-19B can be particularly advantageous over prior art systems and methods for accurately determining the available carrier shipment routes between origin and destination address locations. For example, using traditional methods it is generally not possible to automatically distinguish between address locations (e.g. the Georgia World Congress Center) within a service area (e.g. zip codes 30303, 30313) from other address locations within the same service area having substantially different options for shipping services that may be provided by a plurality of competing carriers.

Figure 17:
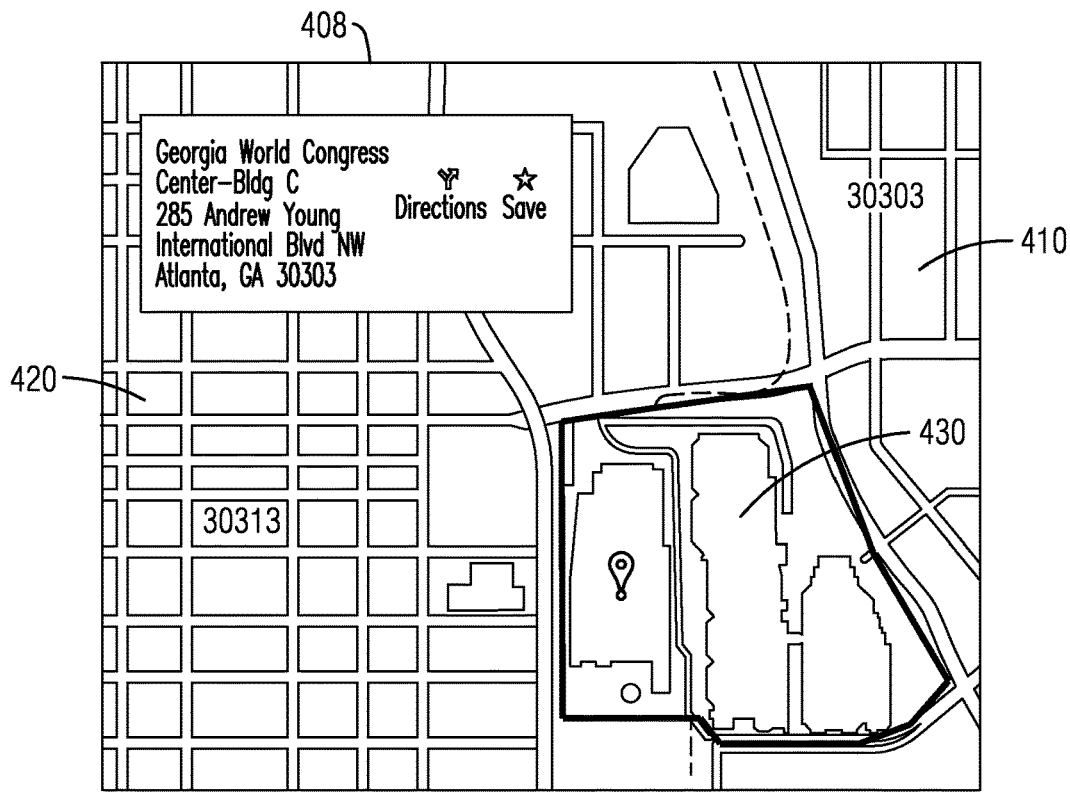

In another aspect of the route determination system and method illustrated in FIG. 17, it is also possible that the available shipping services provided by a carrier to and from each of the buildings in the Georgia World Congress Center can be similar to each other while being different from those provided to the surrounding locations in the 30303 and 30313 geographic services areas. In this representative implementation, each of Buildings A, B and C for the Georgia World Congress Center can be combined into a single geographic service area 430 that straddles the original boundary between the 30303 and 30313 geographic services areas for that carrier, and any differences between the shipping services to and from the various buildings in the congress center can be captured with route guide polygons that overlie that building. Thus, upon comparing FIGS. 16 and 17, it will be further appreciated that the route determination system and method disclosed herein is inherently flexible and individually customizable for each carrier, and that the detailed limitations or restrictions on shipping services provided by those carriers can be captured in a variety of setups and formats that best meet the needs of those carriers.

Figure 20:
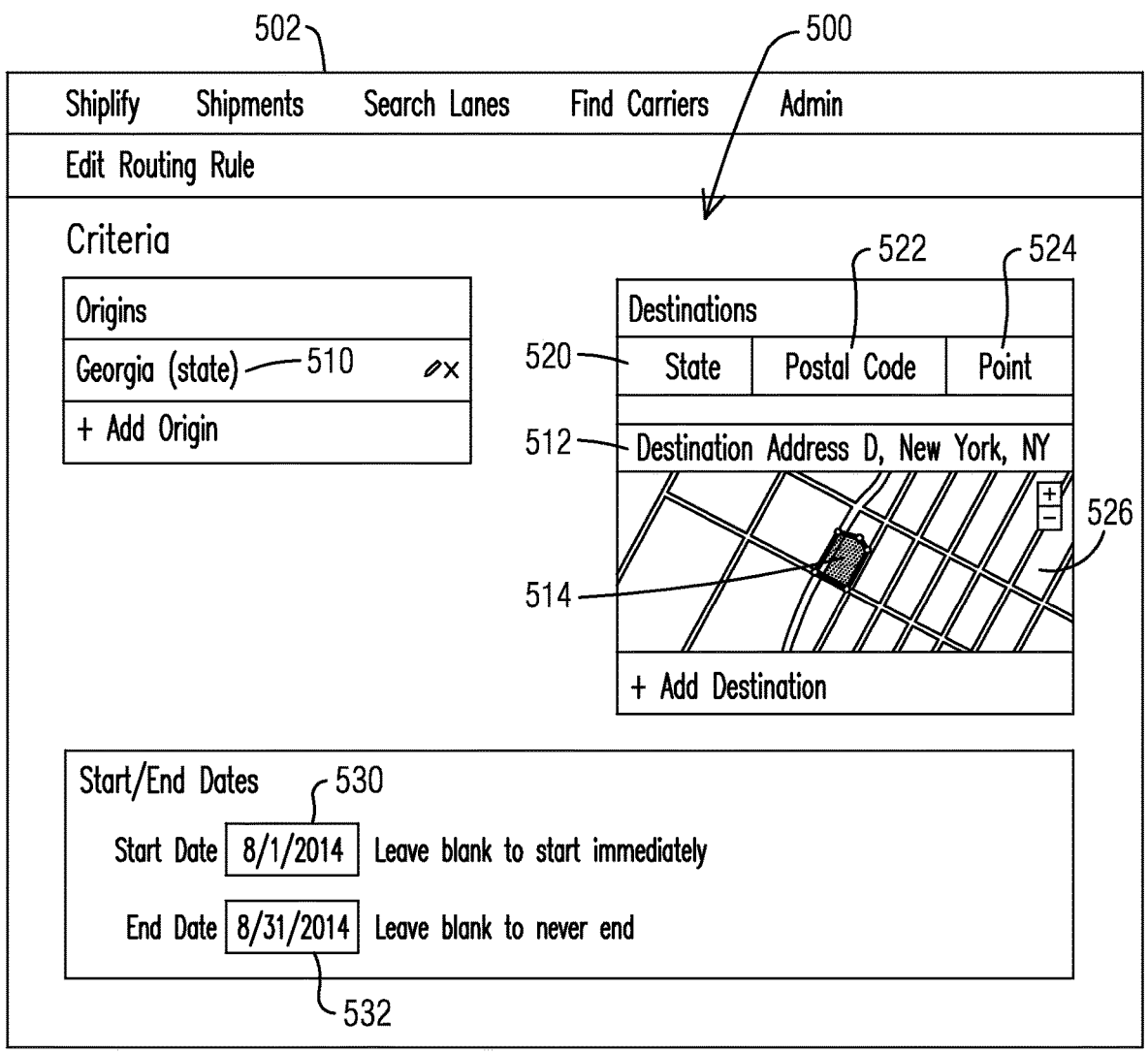
FIG. 20 is a representative screen shot of the creation of a routing rule using a mapping service, in accordance with another representative implementation.

In accordance with yet another representative implementation, FIG. 20 is a representative screen shot 502 of the creation of a system-based or location-based routing rule 500 that includes one or more origin areas or origin locations 510, and one or more destinations areas or destination locations 512. Whether used as an origin or as destination, each identifier for an area or location can designate a routing rule polygon that is also a virtual geospatial object stored in PRSTGRES format in the route database 25 that corresponds to that geographic area or location. With the routing rule 500, for instance, the origin area 510 designates a routing rule polygon that corresponds to the geographic area of the state of Georgia, while the destination location 512 designates a routing rule polygon 514 that corresponds to the physical address at "Destination Address D" in New York City, such as a convention center, a sporting venue, a theater location, a place of business, etc.

In contrast to the service area polygons that together Run the geographic service region of a particular carrier, as described above, the routing rule polygons identified in a routing rule 500 may not be associated with any particular carrier. Instead, the routing rule polygons may simply be stored in the route database and made available to define the origins/destinations for any number of system-based or location-based routing rules that can be used to further filter the available carrier-based routes identified by the route determination system in response to a specific shipping request query. As shown in FIG. 20, in one aspect the "areas" that can be included within either the origin or destination portions of the routing rule can include predetermined routing rule polygons corresponding to a state 520 or to a zip code 522. Like the route guide polygons described above, a mapping service 526 can also be used to define customizable virtual geospatial objects 514 that correspond to the destination 512 (or origin) for the routing rule 500, such as for a specific address or point location 524.

Figure 22:
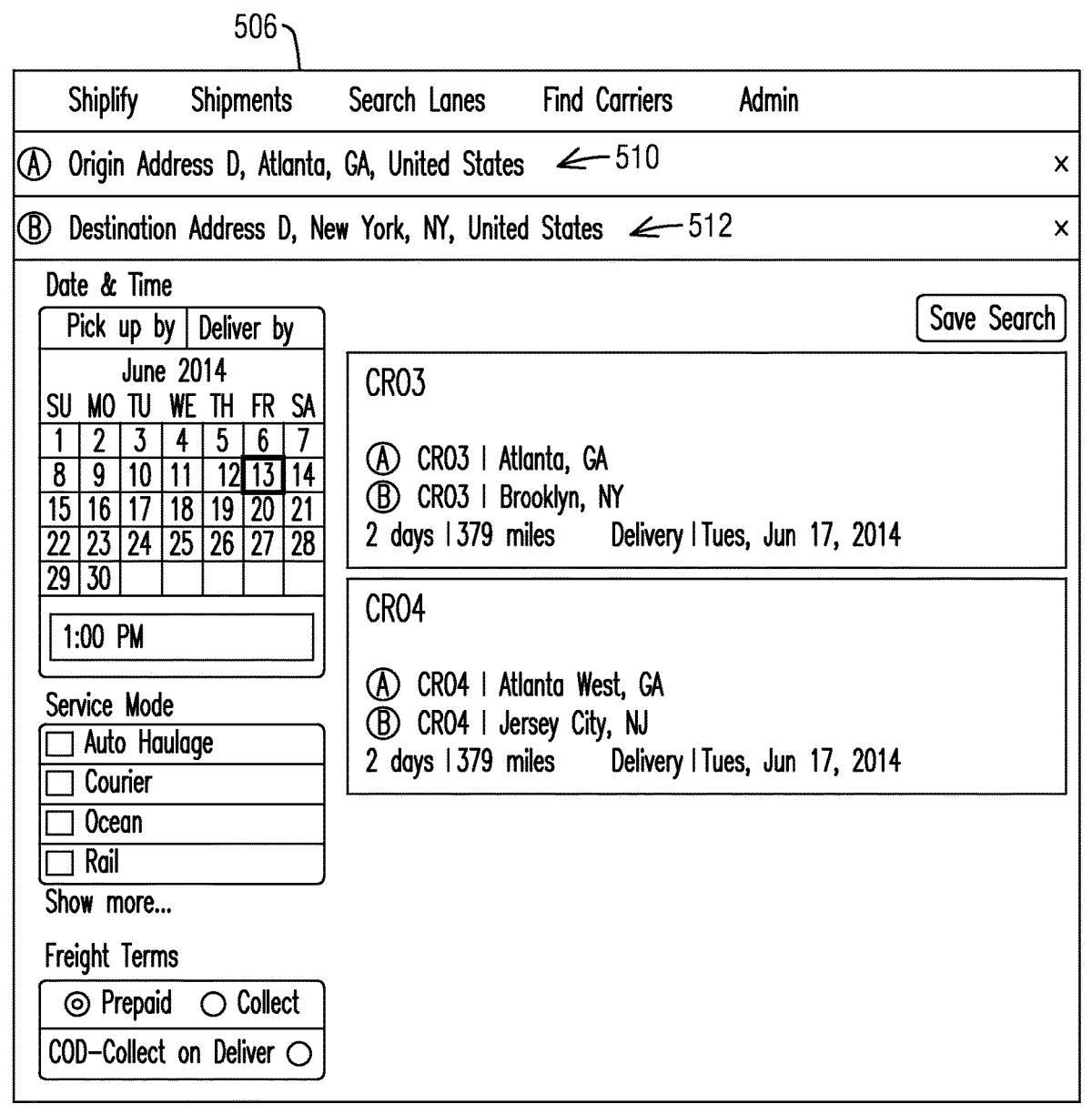

The routing rule 500 can also include a start date 530 or an end date 532 or both, depending on the purpose of the routing rule. For example, as shown in the routing rule management table 504 shown in FIG. 21 and the results 506 of a shipping request query shown FIG. 22, the route rule 500 can be a temporary, location-based restriction that limits any shipping service originating in Georgia (e.g. Origin Address D in Atlanta Ga.) and ending at Destination Address D in New York City to two carriers, namely CR03 and CR04, for the time period between Aug. 1, 2014 and Aug. 31, 2014. Such location-based restrictions are generally created by authenticated customers who own or control the place of business at the destination address 512, and who have entered into an agreement with one or more carriers (CR03, CR04) to only accept shipments coming from the originating state 510 at the destination address 512 that have been carried by the allowed carriers. However, other reasons and arrangements for using a routing rule to limit the shipping services between a predetermined origin area/location and a predetermined destination area/location are also possible and considered to fall within the scope of the present disclosure.

Yet another representative implementation of the route determination system includes the routing rule management table 504 illustrated in FIG. 21, in which routing rules 550 can also be created by the system administrator to promote carriers between one or more origin areas or origin locations 552 and one or more destinations areas or destination locations 554. In the illustrated implementation, for example, carriers CR01 and CR02 can pay a fee to the route determination service to promote 556 their shipping services to the top of the listing of available routes for any shipping request query with an origin location that falls within area code 30315 (552) and a destination location that falls within Minnesota, North Carolina, Indiana, and Texas (554). As shown in the results 508 of a shipping request query (FIG. 23) in which the Origin Address E (562) is located within area code 30315 and the Destination Address E (564) is located within Minnesota, the route listing 560 for carrier CR01 and the route listing 570 for carrier CR02 can be promoted to the top of the route listings.

As known to one of skill in the art in the shipping industries, the number of major motor carriers in North America alone can number in the hundreds, with each carrier potentially having their geographic region being subdivided, depending upon the size and complexity of their shipping business, into thousands or tens of thousands virtual service area polygons. Therefore, upon aggregating together all of the possible route permutations for all of the carriers into one route database 25, as depicted in FIG. 1, it is contemplated that the route database 25 may include tens of millions of predefined routes linking together hundreds of thousands virtual geospatial objects. Moreover, many of these routes will be affected by the additional route guide polygons that identify changes to the shipping services provided within the physical service areas, along with the routing rules and the additional layer(s) of routing rule polygons that define the origin and destination area/locations for the routing rules, all of which may also be included within the route database 25. In one aspect, it will therefore be appreciated that the sheer number of virtual geospatial objects (e.g. the service area polygons, the route guide polygons, and the routing rule polygons) and the individually-defined routes and routing rules utilized by the route determination system and methods generally requires a computerized system to automatically determine the available shipping options between an origin address location and a destination address location provided by a user.

In response to the size of the route database 25 discussed above, in one representative implementation it may be desirable to sub-divide the route database into a plurality of look-up tables in order to improve the efficiency and speed in identifying the available carrier shipment routes between an origin address location and a destination address location. For example, it is known that sub-dividing a large database into look-up tables can substantially reduce the amount of data entries that need to be searched in order to identify one or more items of relevant information, thereby increasing the speed of a query process for finding that information. However, as also understood by those of skill in the art, it can be difficult to create an organizational structure in complex databases that ensures that the correct look-up table is selected first, and that all of the relevant information is contained within the selected look-up table. Otherwise, any time savings would be lost or substantially reduced if each of the look-up tables much be searched until the correct table is found.

Furthermore, the accuracy and reliability of the system would also be sacrificed if only a portion of the available relevant information was identified in the query results because a single look-up table was accessed while other tables also containing relevant information were missed. This can be especially difficult when the queried data includes multiple levels of organization (i.e., for example, the larger service area polygons built up from a plurality of smaller service area polygons) with the different portions of the various levels being assigned to different look-up tables. Other problematic influences for using look-up tables in complex databases such as the route database 25 described above include the large number of different entities (i.e., for example, shipping carriers) with similar but distinct data entries, the number of different potential solutions to the same query (i.e. for example, different shipment modes between the same address locations), and the like.

The system and method of the present disclosure can overcome these difficulties by sub-dividing the route database 25 into look-up tables that are organized along the same geo-spatial coordinate system (e.g. latitude and longitude) as the virtual geometric objects. In the representative example illustrated in FIG. 24, for instance, a geographic region 602 that is serviced by the route determination program running on the electronic processor 22 and included within the route database 25 (FIG. 1) can be sectioned into a plurality of longitudinal or meridian strips 660, with the edges of each of the meridian strips 660 defining the geospatial boundaries of a look up table in the route database 25. All of virtual geometric objects (e.g. the service area polygons, the route guide polygons, and the routing rule polygons) that fall within a meridian strip 660 are then assigned or organized under the look-up table that is associated with that strip. For example, the geospatial definition data for smaller service area polygon 634 that falls within the boundaries of meridian strip 662 is entered into the look-up table associated with meridian strip 662, while the geospatial definition data for smaller service area polygon 644 that falls within the boundaries of meridian strip 664 is entered into the look-up table associated with meridian strip 664.

In one aspect the width of the meridian strips 660 can correspond to the geography of the earth, and can range from about 2 degrees to about 10 degrees in angular width, with a preferred angular width of about 4 degrees.

Figure 24:
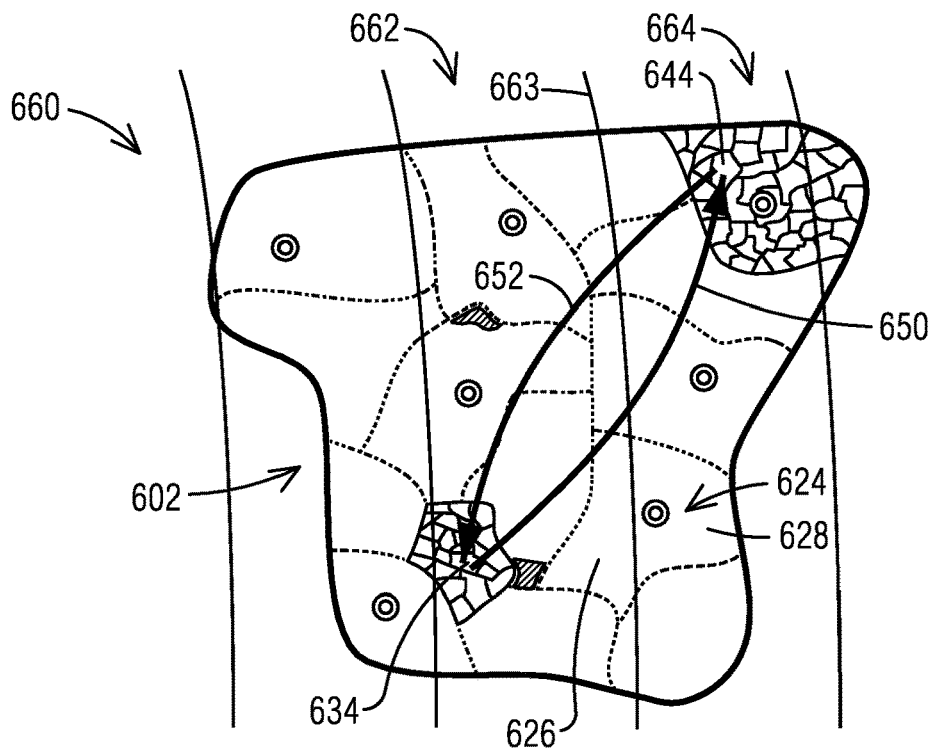
FIG. 24 is a schematic map of a geographic region included with the route database and partitioned into a plurality of meridian strips for organization of the geospatial objects associated with that geographic region within the route database, in accordance with another representative implementation.

In the event that a boundary line 663 between two meridian strips 662, 664 crosses through a virtual geometric object, such as the larger service area polygon 624 shown in FIG. 24, the route determination program can operate to automatically split the virtual geometric object 624 along the meridian boundary line 663 into two or more smaller virtual geometric objects 626, 628, with the geospatial definition data for each of the smaller virtual geometric objects 626, 628 being entered into the look-up table associated with its respective meridian strip 662, 664. In one aspect the portion of the boundary line 663 that contacts the virtual geometric objects 626, 628 may then become the new boundary for the smaller virtual geometric objects 626, 628. It will be understood that the sub-division of virtual geometric objects by the boundary lines between meridian strips into separate look up tables can also apply to the route guide polygons and to the routing rule polygons.

As previously discussed and illustrated, route definitions generally define an available shipping service provided by a carrier between an origin service area polygon and a destination service area polygon within that carrier's geographic service region. When organizing the various virtual geometric objects in the route database 25 under look-up tables, the route definitions can be organized under the look-up tables according to their origin service area polygons. For example, representative route 650 in FIG. 24 defines an available shipping service provided by the carrier between service area polygon 634 and service area polygon 644 when the shipment originates in service area polygon 634. In accordance with one representative implementation, the route definition data for route 650 may then be assigned or organized with its origin service area polygon 634 under the look-up table associated with meridian strip 662. Similarly, representative route 652 defines an available shipping service provided by the carrier between the origin service area polygon 644 and the destination service area polygon 634, and its route definition data may then be assigned or organized with its origin service area polygon 644 under the look-up table associated with meridian strip 664.

When the origin service area polygon of a particular route is sub-divided by a meridian strip boundary line, such as boundary line 663 that splits the larger service area polygon 624 into two or more smaller virtual geometric objects 626, 628, the same route definition data that applied to the whole service area polygon 624 can be duplicated in separate entries in the look-up tables associated with meridian strip 662 and meridian strip 664, one entry for each of the smaller virtual geometric objects 626, 628, respectively. Although these additional entries can result in a nominal increase in the overall size of the route database 25, the increase in the size of the searchable database is readily offset by the increase in query speed and efficiency by limiting the search to a single look-up table that is selected by the origin address location of the query.

Figure 25:
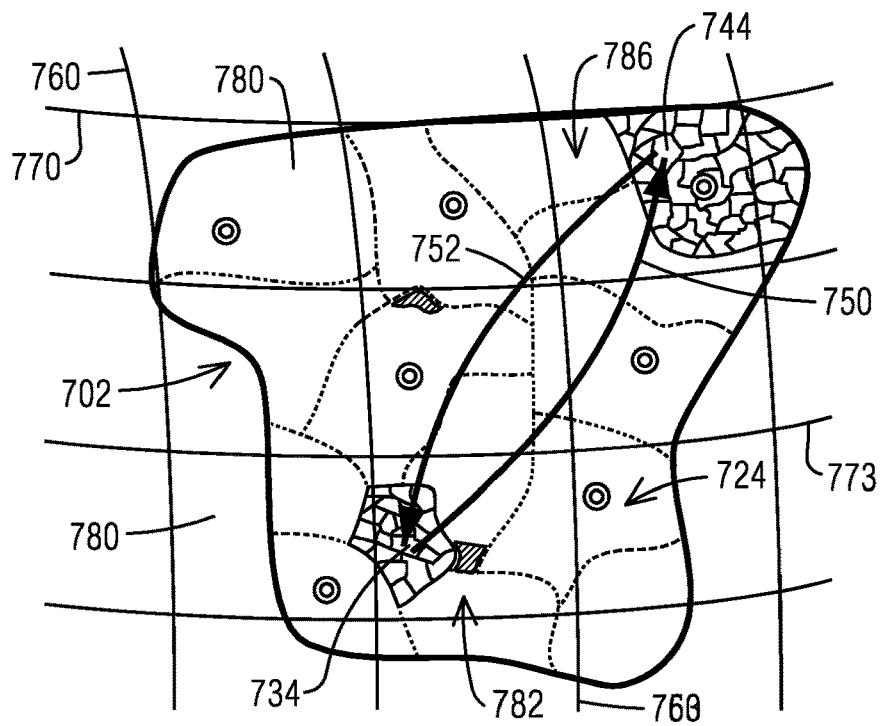
FIG. 25 is a schematic map of a geographic region included with the route database and partitioned into a plurality of geographic sections for organization of the geospatial objects associated with that geographic region within the route database, in accordance with yet another representative implementation.

In another aspect of the present disclosure shown in FIG. 25, a geographic region 702 that is serviced by the route determination program and included within the route database 25 can be sub-divided into a plurality of geographic sections 780 by longitudinal boundary lines 760 and latitude boundary lines 770, with each of the geographic sections 780 defining the geospatial boundaries of a look up table in the route database 25. All of virtual geometric objects (e.g. the service area polygons, the route guide polygons, and the routing rule polygons) that fall within a particular geographic section 780 are then assigned or organized under the look-up table that is associated with that geographic section. For example, the definition data for smaller service area polygon 734 that falls within the boundaries of geographic section 782 is entered into the look-up table associated with geographic section 782, while the definition data for smaller service area polygon 744 that falls within the boundaries of geographic section 786 is entered into the look-up table associated with geographic section 786.

In the event that a boundary line 760, 770 crosses through a virtual geometric object, such as the larger service area polygon 724 shown in FIG. 25, the route determination program can operate to automatically split the virtual geometric object 724 along the boundary lines 763, 773 into smaller virtual geometric objects, with the geospatial definition data for each of the smaller virtual geometric objects being assigned or organized under the look-up table associated with its respective geographic section. As indicated above, this feature can apply to the route guide polygons and to the routing rule polygons as well as to the service area polygons.

The route definitions 750, 752 of FIG. 25 can also be organized into the look-up tables according to their origin service area polygons. For example, representative route 750 defines an available shipping service provided by a carrier between origin service area polygon 734 and destination service area polygon 744, and its route definition data may be organized with its origin service area polygon 734 under the look-up table associated with geographic section 782. Similarly, representative route 752 defines an available shipping service provided by a carrier between origin service area polygon 744 and the destination service area polygon 734, and its route definition data may be organized with its origin service area polygon 744 under the look-up table associated with geographic section 786.

Thus, the present system and method can overcome the known difficulties for applying look-up tables in complex databases by organizing the look-up tables along the same geo-spatial coordinate system as the virtual geometric objects, and then subdividing any virtual geometric objects that are crossed by a boundary line between look-up tables (e.g. the service area polygons, the route guide polygons, and the routing rule polygons) into two or more smaller but complete virtual geometric objects. Each of the smaller virtual geometric objects can then be provided with duplicate definition data that corresponds to the whole geometric object before division.

Furthermore, and in another aspect of the present disclosure, the sub-division of the virtual geometric objects and their associated routes into separate look-up tables can be automated within the route determination program so that the presence of the subdivided virtual geometric objects and routes is substantially invisible to the user of the route determination program. In this way the user can continue to modify the shapes and/or definitions of the whole virtual geometric objects as previously entered into the database, with the route determination program automatically updating the look-up tables to incorporated the amended data.

The foregoing description of the disclosure illustrates and describes various representative implementations of the present disclosure. As various changes could be made in the above-described system and methods for determining available shipment options between origin address locations and destination address locations without departing from the scope of the disclosure, it is intended that all matter disclosed in the above description or shown in the accompanying drawings shall be interpreted as illustrative and not in a limiting sense. Furthermore, the scope of the present disclosure covers various modifications, combinations, alterations, etc., of the above-described implementations of the present disclosure that are within the scope of the claims.

Additionally, while the disclosure shows and describes only selected representative implementations of the system and methods for determining available shipment options between origin address locations and destination address locations, it will be understood that the present disclosure further is capable of use in various other combinations and environments, and is capable of various changes or modifications within the scope of the inventive concept as expressed herein, commensurate with the above teachings, and/or within the skill or knowledge of the relevant art. Furthermore, certain features and characteristics of each implementation may be selectively interchanged and applied to other illustrated and non-illustrated implementations of the disclosure.

What is claimed is:

1. A method for shipment route determination comprising:
   generating virtual geospatial polygons, each virtual geospatial polygon representing at least one physical address therein having one or more shipping service characteristics and a corresponding transit path;
   storing the virtual geospatial polygons across relational databases that are accessible by a server for the shipment route determination, each virtual geospatial polygons being sub-divided into multiple virtual geometric objects using boundary lines, each boundary line having a separate lookup table in the relational databases, wherein same route definition data for a corresponding virtual geospatial polygon is duplicated and included as separate entries in corresponding lookup tables for a corresponding one of the boundary lines;
   receiving, at the server, a shipping query from an origin address to a destination address, the shipping query identifying a pickup time frame and a delivery time frame, at least one shipment mode, and a payment scheme;
   determining, by the server through a relational database lookup process, a first virtual geospatial polygon associated with the origin address and a second virtual geospatial polygon associated with the destination address, wherein the first virtual geospatial polygon and the second virtual geospatial polygon are determined using an application programming interface communicatively coupled to a backend conversion service to convert addresses to latitude and longitude coordinate pairs that define one or more of the boundary lines;
   automatically determining a plurality of transit paths between the origin address and the destination address based on corresponding shipping service characteristics of the first virtual geospatial polygon and the second virtual geospatial polygon identified in a relevant lookup table for the one or more boundary lines formed of the latitude and longitude coordinate pairs, the relevant lookup table being identified using the relational database lookup process, wherein at least one of the plurality of transit paths is determined to be serviced by two different carriers based on the corresponding shipping service characteristics of the first virtual geospatial polygon and the second virtual geospatial polygon and a type of shipment service provided by each of the two different carriers;
   generating a number of shipping options for the shipping query based on the pickup time frame and the delivery time frame, the at least one shipment mode, and the payment scheme, each of which corresponds to one or more of the plurality of transit paths; and
   executing computer-readable code on a graphical user interface to cause a visual display of the number of shipping options and the plurality of transit paths, the visual display being an interactive display allowing for selection of one of the number of shipping options.

2. The method of claim 1, wherein the corresponding shipping service characteristics include presence or absence of a loading dock at a corresponding physical address.

3. The method of claim 1, wherein the corresponding shipping service characteristics include a limitation in availability of accessorial services at a corresponding physical address.

4. The method of claim 1, wherein the corresponding shipping service characteristics include an added tariff for pickup or delivery of package at a corresponding physical address.

5. The method of claim 1, further comprising:
   modifying the virtual geospatial polygons based on changes to one or more physical addresses in each virtual geospatial polygon or based on changes to corresponding shipping service characteristics of the one or more physical addresses.

6. The method of claim 5, wherein modifying the virtual geospatial polygons includes combining one or more existing virtual geospatial polygons to generate a larger virtual geospatial polygon encompassing the one or more existing virtual geospatial polygons.

7. The method of claim 5, wherein modifying the virtual geospatial polygons includes dividing at least one existing virtual geospatial polygon into two or more smaller virtual geospatial polygons, each of the two or more smaller virtual geospatial polygons having at least one unique physical address contained therein with at least one corresponding shipping service characteristic.

8. The method of claim 1, wherein determining the first virtual geospatial polygon and the second virtual geospatial polygon includes:
   querying the backend conversion service to identify respective latitudes and longitudes of the origin address and the destination address; and
   querying the relational databases based on the respective latitudes and longitudes of the origin address and the destination address to determine the first virtual geospatial polygon and the second virtual geospatial polygon.

9. The method of claim 1, wherein the corresponding transit path includes a first terminal that services the at least one physical address and a second terminal that services a destination physical address.

10. The method of claim 1, wherein the at least one of the plurality of transit paths is serviced by the two different carriers such that a first of the two different carriers provides a first shipment service matching a first shipping service characteristic at the origin address and a second of the two different carriers provides a second shipment service matching a second shipping service characteristic at the destination address.

11. A system for shipment route determination comprising:
one or more processors; and
at least one non-transitory computer-readable medium having stored therein computer-readable instructions which, when executed by the one or more processors, cause the one or more processors to:
generate virtual geospatial polygons, each virtual geospatial polygon representing at least one physical address therein having one or more shipping service characteristics and a corresponding transit path;
store the virtual geospatial polygons across relational databases that are accessible by a server for the shipment route determination, each virtual geospatial polygons being sub-divided into multiple virtual geometric objects using boundary lines, each boundary line having a separate lookup table in the relational databases, wherein same route definition data for a corresponding virtual geospatial polygon is duplicated and included as separate entries in corresponding lookup tables for a corresponding one of the boundary lines;
receive, at the server, a shipping query from an origin address to a destination address, the shipping query identifying a pickup time frame and a delivery time frame, at least one shipment mode, and a payment scheme;
determine, by the server through a relational database lookup process, a first virtual geospatial polygon associated with the origin address and a second virtual geospatial polygon associated with the destination address, wherein the first virtual geospatial polygon and the second virtual geospatial polygon are determined using an application programming interface communicatively coupled to a backend conversion service to convert addresses to latitude and longitude coordinate pairs that define one or more of the boundary lines;
automatically determine a plurality of transit paths between the origin address and the destination address based on corresponding shipping service characteristics of the first virtual geospatial polygon and the second virtual geospatial polygon identified in a relevant lookup table for the one or more boundary lines formed of the latitude and longitude coordinate pairs, the relevant lookup table being identified using the relational database lookup process, wherein at least one of the plurality of transit paths is determined to be serviced by two different carriers based on the corresponding shipping service characteristics of the first virtual geospatial polygon and the second virtual geospatial polygon and a type of shipment service provided by each of the two different carriers;
generate a number of shipping options for the shipping query based on the pickup time frame and the delivery time frame, the at least one shipment mode, and the payment scheme, each of which corresponds to one or more of the plurality of transit paths; and
execute computer-readable code on a graphical user interface to cause a visual display of the number of shipping options and the plurality of transit paths, the visual display being an interactive display allowing for selection of one of the number of shipping options.

12. The system of claim 11, wherein the corresponding shipping service characteristics include presence or absence of a loading dock at a corresponding physical address.

13. The system of claim 11, wherein the corresponding shipping service characteristics include a limitation in availability of accessorial services at a corresponding physical address.

14. The system of claim 11, wherein the corresponding shipping service characteristics include an added tariff for pickup or delivery of package at a corresponding physical address.

15. The system of claim 11, wherein the one or more processors are further configured to execute the computer-readable instructions to:
modify the virtual geospatial polygons based on changes to one or more physical addresses in each virtual geospatial polygon or based on changes to corresponding shipping service characteristics of the one or more physical addresses.

16. The system of claim 15, wherein the one or more processors are configured to execute the computer-readable instructions to modify the virtual geospatial polygons by combining one or more existing virtual geospatial polygons to generate a larger virtual geospatial polygon encompassing the one or more existing virtual geospatial polygons.

17. The system of claim 15, wherein the one or more processors are configured to execute the computer-readable instructions to modify the virtual geospatial polygons by dividing at least one existing virtual geospatial polygon into two or more smaller virtual geospatial polygons, each of the two or more smaller virtual geospatial polygons having at least one unique physical address contained therein with at least one corresponding shipping service characteristic.

18. The system of claim 11, wherein the one or more processors are configured to execute the computer-readable instructions to determine the first virtual geospatial polygon and the second virtual geospatial polygon by:
querying the backend conversion service to identify respective latitudes and longitudes of the origin address and the destination address; and
querying the relational databases based on the respective latitudes and longitudes of the origin address and the destination address to determine the first virtual geospatial polygon and the second virtual geospatial polygon.

19. The system of claim 11, wherein the corresponding transit path includes a first terminal that services the at least one physical address and a second terminal that services a destination physical address.

20. The system of claim 11, wherein the at least one of the plurality of transit paths is serviced by the two different carriers such that a first of the two different carriers provides a first shipment service matching a first shipping service characteristic at the origin address and a second of the two different carriers provides a second shipment service matching a second shipping service characteristic at the destination address.

21. A non-transitory computer-readable medium comprising computer-readable instructions stored therein which, when executed by one or more processors of a system for shipment route determination, cause the one or more processors to:

generate virtual geospatial polygons, each virtual geospatial polygon representing at least one physical address therein having one or more shipping service characteristics and a corresponding transit path;

store the virtual geospatial polygons across relational databases that are accessible by a server for the shipment route determination, each virtual geospatial polygons being sub-divided into multiple virtual geometric objects using boundary lines, each boundary line having a separate lookup table in the relational databases, wherein same route definition data for a corresponding virtual geospatial polygon is duplicated and included as separate entries in corresponding lookup tables for a corresponding one of the boundary lines;

receive, at the server, a shipping query from an origin address to a destination address, the shipping query identifying a pickup time frame and a delivery time frame, at least one shipment mode, and a payment scheme;

determine, by the server through a relational database lookup process, a first virtual geospatial polygon associated with the origin address and a second virtual geospatial polygon associated with the destination address, wherein the first virtual geospatial polygon and the second virtual geospatial polygon are determined using an application programming interface communicatively coupled to a backend conversion service to convert addresses to latitude and longitude coordinate pairs that define one or more of the boundary lines;

automatically determine a plurality of transit paths between the origin address and the destination address based on corresponding shipping service characteristics of the first virtual geospatial polygon and the second virtual geospatial polygon identified in a relevant lookup table for the one or more boundary lines formed of the latitude and longitude coordinate pairs, the relevant lookup table being identified using the relational database lookup process, wherein at least one of the plurality of transit paths is determined to be serviced by two different carriers based on the corresponding shipping service characteristics of the first virtual geospatial polygon and the second virtual geospatial polygon and a type of shipment service provided by each of the two different carriers;

generate a number of shipping options for the shipping query based on the pickup time frame and the delivery time frame, the at least one shipment mode, and the payment scheme, each of which corresponds to one or more of the plurality of transit paths; and execute computer-readable code on a graphical user interface to cause a visual display of the number of shipping options and the plurality of transit paths, the visual display being an interactive display allowing for selection of one of the number of shipping options.

22. The non-transitory computer-readable medium of claim 21, wherein the corresponding shipping service characteristics include presence or absence of a loading dock at a corresponding physical address.

23. The non-transitory computer-readable medium of claim 21, wherein the corresponding shipping service characteristics include a limitation in availability of accessorial services at a corresponding physical address.

24. The non-transitory computer-readable medium of claim 21, wherein the corresponding shipping service characteristics include an added tariff for pickup or delivery of package at a corresponding physical address.

25. The non-transitory computer-readable medium of claim 21, wherein the execution of the computer-readable instructions by the one or more processors, further cause the one or more processors to:

modify the virtual geospatial polygons based on changes to one or more physical addresses in each virtual geospatial polygon or based on changes to corresponding shipping service characteristics of the one or more physical addresses.

26. The non-transitory computer-readable medium of claim 25, wherein the execution of the computer-readable instructions by the one or more processors, further cause the one or more processors to modify the virtual geospatial polygons by combining one or more existing virtual geospatial polygons to generate a larger virtual geospatial polygon encompassing the one or more existing virtual geospatial polygons.

27. The non-transitory computer-readable medium of claim 25, wherein the execution of the computer-readable instructions by the one or more processors, further cause the one or more processors to modify the virtual geospatial polygons by dividing at least one existing virtual geospatial polygon into two or more smaller virtual geospatial polygons, each of the two or more smaller virtual geospatial polygons having at least one unique physical address contained therein with at least one corresponding shipping service characteristic.

28. The non-transitory computer-readable medium of claim 21, wherein the execution of the computer-readable instructions by the one or more processors, further cause the one or more processors to determine the first virtual geospatial polygon and the second virtual geospatial polygon by:

querying the backend conversion service to identify respective latitudes and longitudes of the origin address and the destination address; and querying the relational databases based on the respective latitudes and longitudes of the origin address and the destination address to determine the first virtual geospatial polygon and the second virtual geospatial polygon.

29. The non-transitory computer-readable medium of claim 21, wherein the corresponding transit path includes a first terminal that services the at least one physical address and a second terminal that services a destination physical address.

30. The non-transitory computer-readable medium of claim 21, wherein the at least one of the plurality of transit paths is serviced by the two different carriers such that a first of the two different carriers provides a first shipment service matching a first shipping service characteristic at the origin address and a second of the two different carriers provides a second shipment service matching a second shipping service characteristic at the destination address.

* * * * *